United States Patent [19]

Zock

[11] 3,885,108

[45] May 20, 1975

[54] TELEPHONE DIALING SYSTEM

[76] Inventor: Joseph Zock, St. Kilda Residential Hotel, Abel Rd., Berea, Johannesburg, South Africa

[22] Filed: Apr. 16, 1973

[21] Appl. No.: 351,451

[52] U.S. Cl. ............ 179/90 B; 179/2 DP; 179/5 R; 179/90 AD

[51] Int. Cl. ............ H04m 1/44

[58] Field of Search ... 179/18 B, 2 DP, 5 R, 90 AD, 179/90 BB, 90 B

[56] References Cited

UNITED STATES PATENTS

| | | | |
|---|---|---|---|
| 3,105,121 | 9/1963 | Field | 179/5 R |
| 3,345,463 | 10/1967 | Hynes | 179/5 R |
| 3,400,378 | 9/1968 | Smith | 179/2 DP |
| 3,427,402 | 2/1969 | Stokes | 179/2 DP |
| 3,505,476 | 4/1970 | Kelly | 179/5 R |
| 3,519,745 | 6/1970 | Colman | 179/5 R |

*Primary Examiner*—William C. Cooper
*Assistant Examiner*—C. T. Bartz
*Attorney, Agent, or Firm*—Karl W. Flocks

[57] ABSTRACT

The invention provides a method of calling a number and an automatic dialling device for calling a number. The number is stored in a storage device and controllably emitted onto a telephone line. Sensing means are provided for sensing whether or not calling is effected. If calling is not effected, the number is re-emitted under the control of control means. The device can control the number of times that the number is to be re-called and also the interval between successive attempts to call a number. The device can be used in a PABX system and also in association with a computer terminal modem.

10 Claims, 20 Drawing Figures

TELEPHONE DIALING SYSTEM

This invention relates to a telephone dialling system. It relates in particular to a method of calling a number on a telephone line and to an automatic dialling device for telephones. The method and apparatus is suitable for effecting calling between telephones in any automatic dialling exchange system for speech communication, but can also be used to connect for example an input/output unit or modem at a remote station to a central controller unit such as a computer to permit data transmission via a telephone line.

In accordance with the invention a method of calling a number on a telephone line includes storing a number to be called in a storage device, controllably emitting the stored number from the storage device onto the telephone line to cause calling of the number, sensing whether or not calling of the number is effected, and, if not effected, controlling the storage device automatically to re-emit the stored number to cause recalling of the number.

Further according to the invention there is provided an automatic dialling device for emitting a number to be called onto a telephone line, which includes a storage device adapted to receive a number to be called and operable to emit the stored number onto the telephone line, sensing means adapted to sense whether or not calling of the number is effected, and control means responsive to the sensing means and operable to cause the storage device to re-emit the stored number onto the telephone line to recall the number if calling has not been effected.

The word "number" in this specification is meant to include all characters including numerical and alphabetical characters and symbols, usable as a code for identifying a particular telephone in a telephone system.

The number of times that the stored number can be re-emitted to recall the number may conveniently be controllable. The device may accordingly further include tally storage means for storing a tally representative of the number of times that a particular number is to be recalled, the control means being adapted to cause recalling of the number for a number of times as predetermined by the tally.

The tally storage means may form part of the storage device so that the tally is stored in the storage device together with the number to be called. If desired, the tally when stored in the storage device may be encoded so that the device can distinguish between the number to be called and the tally. Alternatively, the tally may be stored in a separate register or counter.

The interval between successive attempts to call the number stored may conveniently also be controllable. The device may therefore further include timing means, which may be adjustable the control means being responsive to the timing means to provide an interval between successive attempts to recall the number. The device may also be arranged to control the intervals between the emission of individual digits of the number being called.

A plurality of sets of numbers to be called may be stored in the storage device. The storage device may then be controlled selectively to emit individual sets of numbers from the storage device in a predetermined sequence.

The device may include indicating means operable to give a visual indication of the number stored. The device may include further indicating means for indicating to an operator the condition of the device, e.g. whether or not it is idling, calling a number, ringing tone has been obtained, and so on. When audible indicating means are used, the device may include volume control means for controlling the volume of the audible signal.

The calling of the number may be controllably cancelled if, after initiation of the calling of the number, a predetermined period elapses without calling being effected. The device may thus be adapted to detect whether or not once calling of a number has been effected, the operator picks up the telephone handset within a predetermined period.

The device may further include detection means responsive to lifting of the handset of the telephone with which the device is associated, the detection means being operable to interrupt the operation of the device when the handset is lifted.

The sensing means may include tone detection means operable after a number has been called and adapted to sample during a predetermined period the tones appearing on the telephone line thereby to sense whether or not calling of the number has been effected. The tone detection means may include anologue to digital conversion means adapted to convert the tones received on the telephone line to digital pulses or levels.

The device may be adapted for operation in conjunction with a PABX telephone system. The sensing means may then include a dialling tone detector adapted to sense that a dialling tone is present on the telephone line both before and after the emission onto the telephone line of the first digit of the number to be called.

The device may be adapted for association with a computer terminal modem and be adapted to call a number allocated to a computer thereby to permit a telephone connection between the modem and the computer. Monitoring means may then be provided for monitoring the quality of the signals on the telephone line, the monitoring means being adapted to prevent connection of the line to the modem if the quality of the signals is below a predetermined level. The monitoring means may be adapted to monitor both the amplitude and presence of the signal over a predetermined period.

The invention is now described by way of example, with reference to the accompanying drawings, in which.

Figure 1:
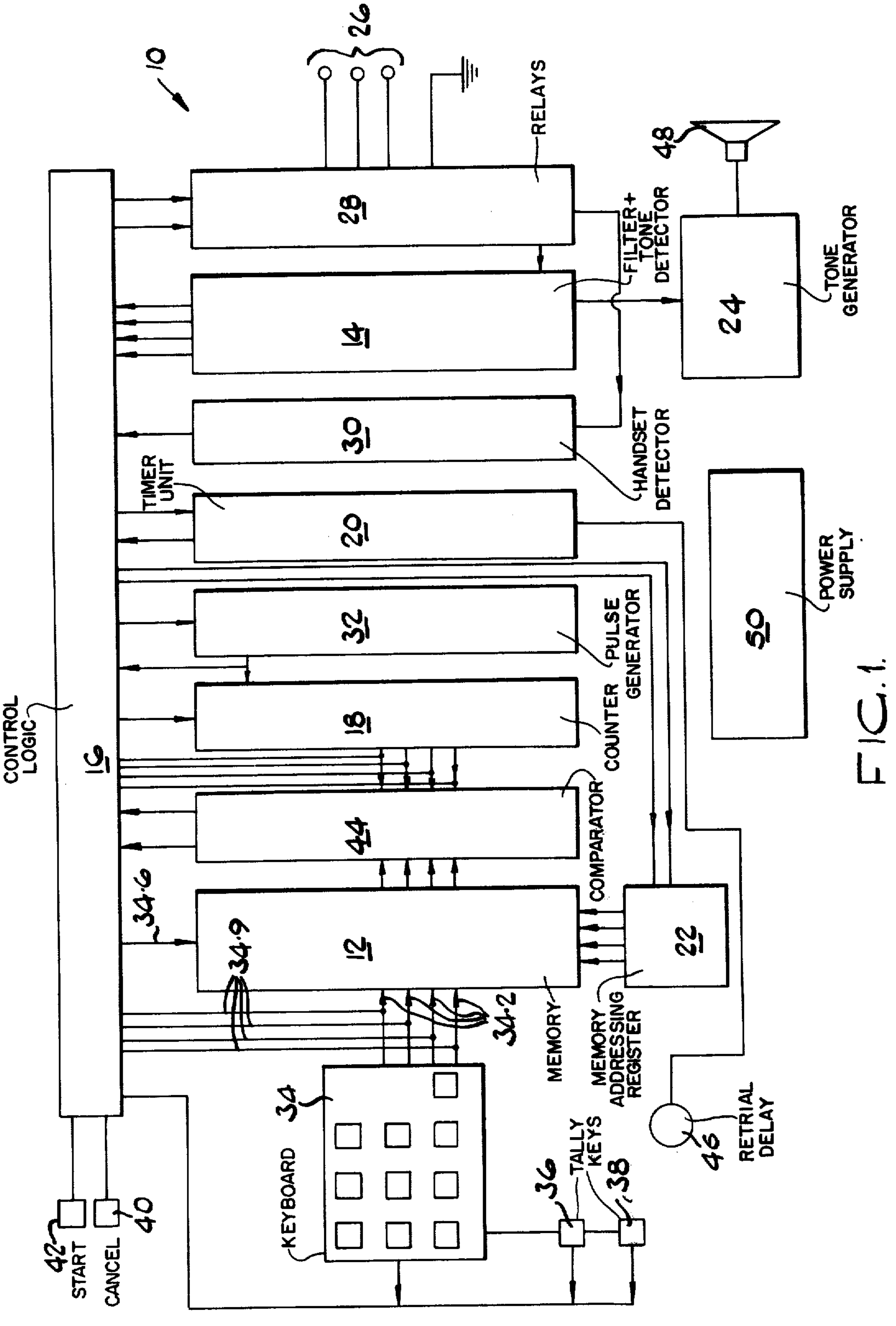
FIG. 1 shows a schematic block diagram of an automatic dialling device in accordance with the invention.

In the figures an "0" is used at the ends of circuit lines and is used to designate points of zero potential or grounds and is not to be confused with terminal connections such as 26 in FIG. 1.

Referring to FIG. 1, reference numeral 10 generally indicates an automatic dialling device for a telephone, which includes a storage device in the form of 16 position, 64 bit memory unit 12, sensing means in the form of filter circuitry and tone detectors 14 for sensning inter alia whether or not calling of a number stored in the storage device 12 is effected, and control means 16 for controlling the operation of the device.

The apparatus further includes counting means in the form of a counter 18 for controlling inter alia the number of times that a particular number is recalled.

Timing means in the form of timer unit 20 is also provided for controlling the intervals between the successive attempts to call a number and for controlling the intervals between the emission of individual digits of the number being called.

A memory address register 22 is provided for addressing individual positions of the memory unit 12.

The device further includes indicating means in the form of an audible tone generator 24 for indicating to an operator via a loudspeaker 48 the condition of the device at any instant.

The number to be called is emitted onto the telephone lines 26 via a coupling relay and impulse relay housed within unit 28.

A handset detector 30 is provided for detecting whether or not the handset of the telephone has been picked-up.

A pulse generator 32 is provided for generating pulses to the various circuit elements.

The number to be called is stored in the memory unit 12 via a keying device 34. Two further keys 36 and 38 are provided associated with the keying device 34 for inserting the tally representing the number of times that a particular number is to be re-called, in the memory unit 12. The key 36 is arranged to store a tally of "four" and the key 38 is arranged to store a tally of "eight". Multiples or combinations of repeat counts can be stored in the memory unit 12 by selectively depressing either of the keys 36 or 38.

The device further includes a cancel key 40 for cancelling the operation of the device at any stage, e.g. in the event that a mistake is made when keying in a number into the storage device, or when it is desired to reset the device and store a further number in the storage device while the apparatus is in operation.

A start or trigger control key 42 is provided to permit the number to be called to be stored in the storage device for an indefinite period and to set the actual calling of the number in motion when the start or trigger key 42 is depressed.

A comparator unit 44 is provided intermediate the memory unit 12 and the counter 18 for comparing each digit of the number to be called and emitted from the memory unit 12 with a corresponding digit pulsed into the counter 18 by the pulse generator 32.

The interval between successive attempts to call a number is adjustable by means of a retrial delay 46, which permits adjustment of this interval within a range of approximately 6 seconds to 90 seconds.

The device further includes a power supply unit 50 for supplying power to the various circuit elements.

In use, in order to store the number to be called in the memory unit 12, the keys of the keying unit 34 are depressed in the correct sequence for the required number. As the keys of the key unit 34 are depressed, the number to be called is inserted in serial form in the memory unit 12 with the individual digits being encoded in binary form and being stored in successive positions of the memory unit 12. After the complete number to be called has been stored, the operator, with the key 36 or the key 38, inserts the tally in the memory unit 12 representing the number of times that the number stored is to be re-called. During insertion of the tally, the device is arranged automatically to encode the tally so that the device can differentiate between a telephone number to be called and the tally. This is done by inserting a "1" bit in the $2^3$ and $2^2$ bit positions of the four bit word which each memory position comprises.

On each depression of either of the keys 36 or 38, a tally of four or eight is stored in the storage device. The final tally is equal to the sum of the individual numbers inserted on each depression of either of the keys 36 or 38.

The device makes provision for storing a tally in each of the remaining positions of the memory unit 12 remaining after the number to be called has been stored. Thus, if the number to be called is a seven digit number, the remaining nine positions of the 16 positions of the memory unit 12 can be filled with the tally. Provision is also made for an indicator light (not shown) to be illuminated when all the positions of the memory unit 12 have been filed.

If a mistake or error is made during keying in of the number to be called or the keying in of the tally, the cancel key 40 is depressed which causes clearing of the memory unit 12.

Once the correct number to be called and the tally have been stored in the memory unit 12, the device can be left for an indefinite period. When it is desired to initiate calling of the number stored, the start key 42 is depressed.

The control means 16 then senses via the tone detectors 14 whether or not a dialling tone is present on the telephone lines 26. If for some reason, the dialling tone is not present within three seconds of depression of the start key 42, the device switches off-line for a period of 6 seconds, whereafter, it will recheck as to whether or not dialling tone is present.

As soon as a dialling tone is detected, the control means activates the pulse generator 32 to apply pulses to the counter 18.

At the same time that the counter 18 is being pulsed, pulses are supplied from the pulse generator 32 to an impulse relay in unit 28. The pulse generator emits the pulses at a repetition frequency of 10 pulses per second, each pulse being of 66 milliseconds duration.

During pulsing of the telephone lines 26 in unison with the pulsing of the counter 18, the comparator unit 44 compares the number of pulses stored in the counter 18 with the most significant digit of the number to be called in the first position of the memory unit 12. As soon as equality between the counter 18 and the most significant digit is sensed by the comparator 44, a signal is sent to the control means 16 to isolate the pulse relay in unit 28 from the telephone lines 26.

In this manner, a number of pulses equal to the most significant digit have been placed on the telephone lines 26. Thus, if the most significant digit is a "three", three pulses will be placed on the telephone lines 26.

When equality between the most significant digit and the counter 18 is sensed, the timer unit 20 comes into operation and it introduces a delay function of approximately one second. During this delay period, the address register 22 is pulsed by the pulse generator 32 so as to address the second position of the memory unit 12 in which the second most significant digit of the number to be called is stored.

After the one second delay has elapsed, the control means 16 causes the counter 18 and impulse relay to be pulsed again by the pulse generator 32, so that the cycle is repeated.

As soon as the control means 16 senses that a digit emitted by the memory unit 12 is not a digit of a number to be called but, rather, is a tally, the timing means 20 introduces a further timing function delay of 25 seconds duration.

This 25 second delay is used by a ringing tone detector in the detector circuits 14 to detect whether or not calling of the number has been effected.

If ringing tone is detected by the ringing tone detector in unit 14, the audible tone generator 24 is activated thereby giving an indication via the loudspeaker 48 that a connection to the required number has been made. At the same time, a visual indication line (not shown) is illuminated.

The operator should now pick up the handset of the calling telephone. If for some reason the handset is not raised within 30 seconds, the handset detector 30 issues an instruction to the control means 16 to cancel the call.

If the handset is raised within the 25 delay period, a coupling relay in unit 28 is activated to connect normal speech circuitry of the telephone receiver to the telephone lines 26.

In the event that ringing tone is not detected, but an engaged tone is detected by the engaged tone detector in the detector circuits 14, the control means 16 causes the coupling relays in unit 28 to uncouple the telephone lines 26 from the telephone receiver. The timing means 20 will then generate a delay period, the delay being dependent upon the setting of the retrial delay 46.

During this delay period, the address register 22 is pulsed by the pulse generator 32 to address the position after the least significant digit of the number to be called in the memory unit 12. This position contains the first digit of the tally. The tally is as previously described always recognisable by a bit being present in both the $2^3$ position and the $2^2$ position of the memory unit.

When the control means 16 senses the tally, the pulse generator 32 pulses the counter 18 and the tally is compared with the number of pulses in the counter 18. The counter 18 is pulsed by the pulse generator 32 until the comparator 44 senses that the number of pulses counted by the counter 18 is one more than the tally. The number of pulses present in the counter 18 is then transferred via the control means 16 into the tally storage position of the memory unit 12. Thus, the original tally is increased by a count of one.

After the delay preset by the interval adjuster 46 has elapsed, the control means 16 will again cause the number to be called to be emitted from the memory unit 12 and a further attempt is made to call the number.

In the event that this second attempt is again unsuccessful, and an engaged tone is detected, the control means 16 exercises a further cycle of events to add a further count of one to the tally, whereafter, after a delay, a further attempt will be made to effect calling of the number.

When after a number of unsuccessful attempts to call a number, the tally in a particular position in the memory unit 12 eventually reaches zero by successive additions of one, the next position of the tally is addressed and, if a tally has been inserted in that position, the cycle of events is repeated as above described.

When all the positions of the memory unit 12 containing tallies have been cleared to zero, the apparatus is arranged to cease functioning and an indication is given to the operator that in spite of repeated attempts, the number to be called is still engaged.

A number unobtainable tone detector is also provided in the tone detector circuitry 14 so that if, after calling of a particular number has been made, a number unobtainable tone is detected, the device returns to its idling condition until such time as the start or trigger key 42 is depressed.

Figure 2:
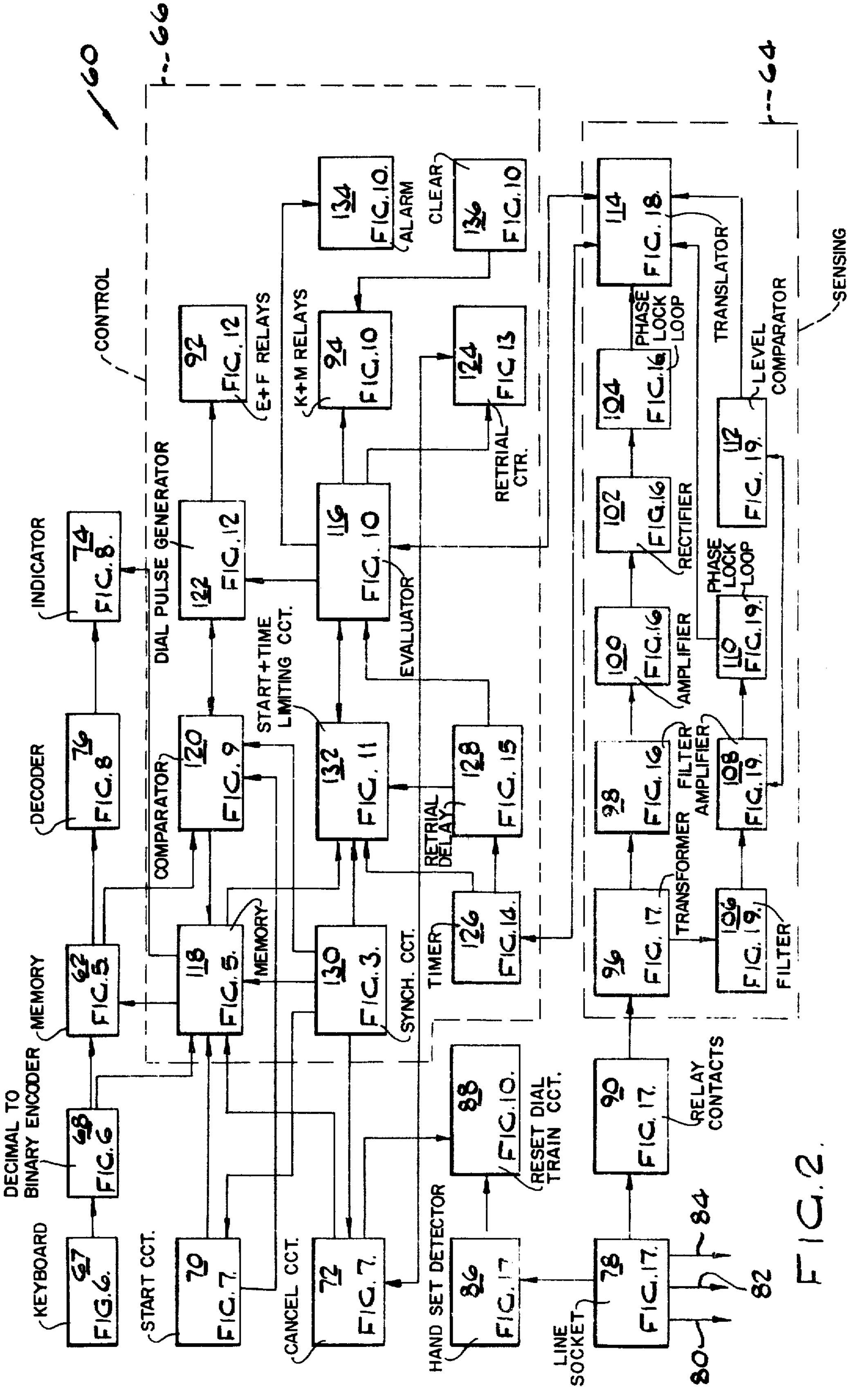
FIG. 2 shows a schematic block diagram of a further embodiment of the automatic dialling device in accordance with the invention.
Figure 5:
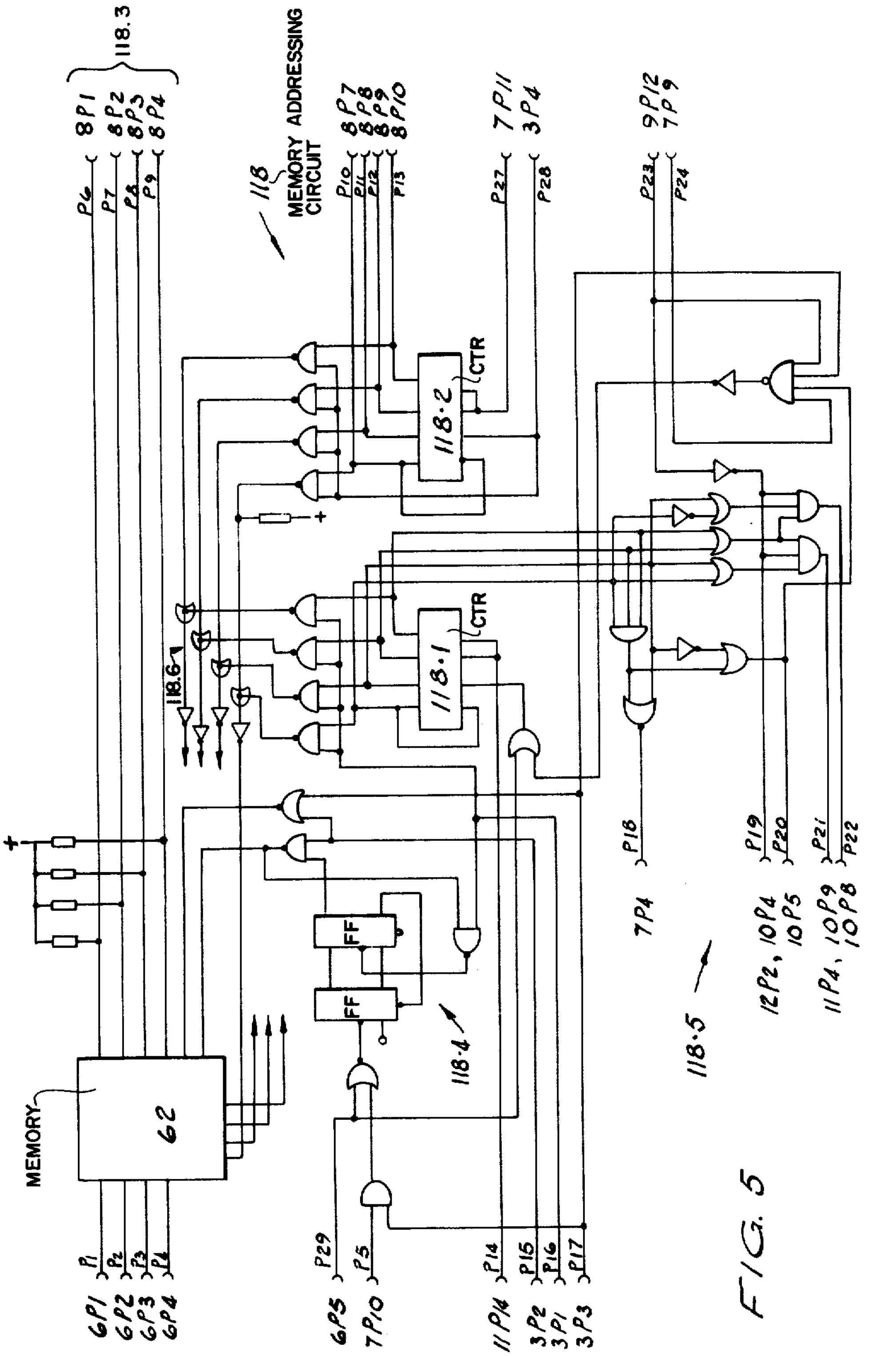
FIG. 5 shows a schematic circuit diagram of the memory and memory addressing circuits used in the FIG. 2 device.

Referring now to FIG. 2, a further embodiment of the invention is schematically illustrated, generally indicated by reference numeral 60. The device includes a storage device in the form of a 64 bit memory 62, details of which are shown in FIG. 5, The device also includes sensing means collectively referenced 64 and adapted to sense the status of the telephone line and detect various signals thereon.

The device also includes control means collectively referenced 66 for controlling the operation of the device.

Figures 6, 7:
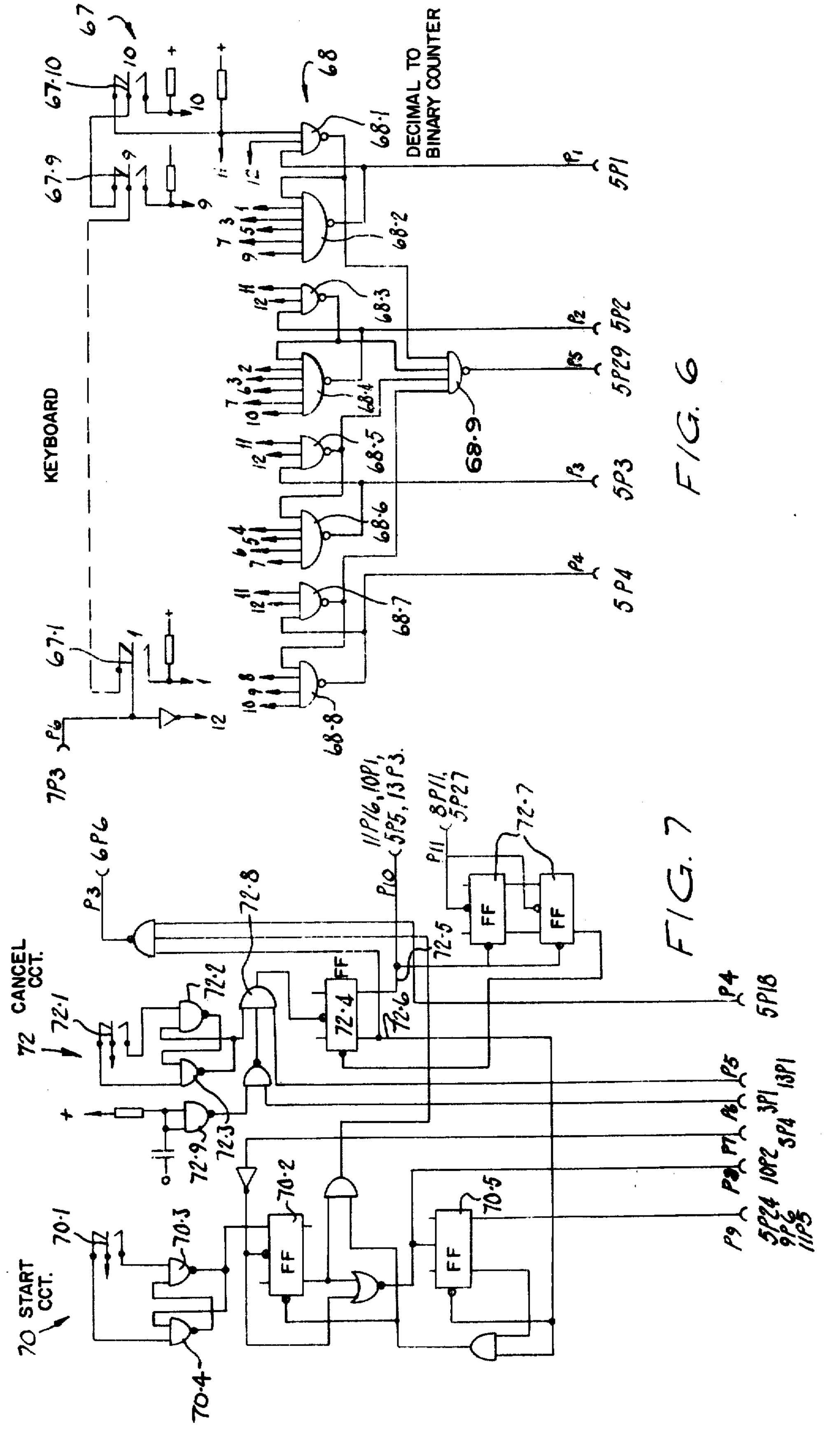
FIG. 6 shows a schematic diagram of the circuitry of the keying unit and the decimal to binary conversion circuitry used in the FIG. 2 device.
FIG. 7 shows a schematic circuit diagram of the start and clear keys and associated circuitry used in the FIG. 2 device.

A keying device 67, details of which are shown in FIG. 6, is used to enter the number to be called in the storage device 62 via a decimal to binary encoder 68, details of which are also shown in FIG. 6.

The initiation of the device is effected by a start key circuit 70, details of which are shown in FIG. 7. A cancel or clear key circuit 72 is provided to permit automatic and manual clearing and cancelling of the operation of the device. Details of the clearing or cancelling circuit are shown in FIG. 7.

Figure 8:
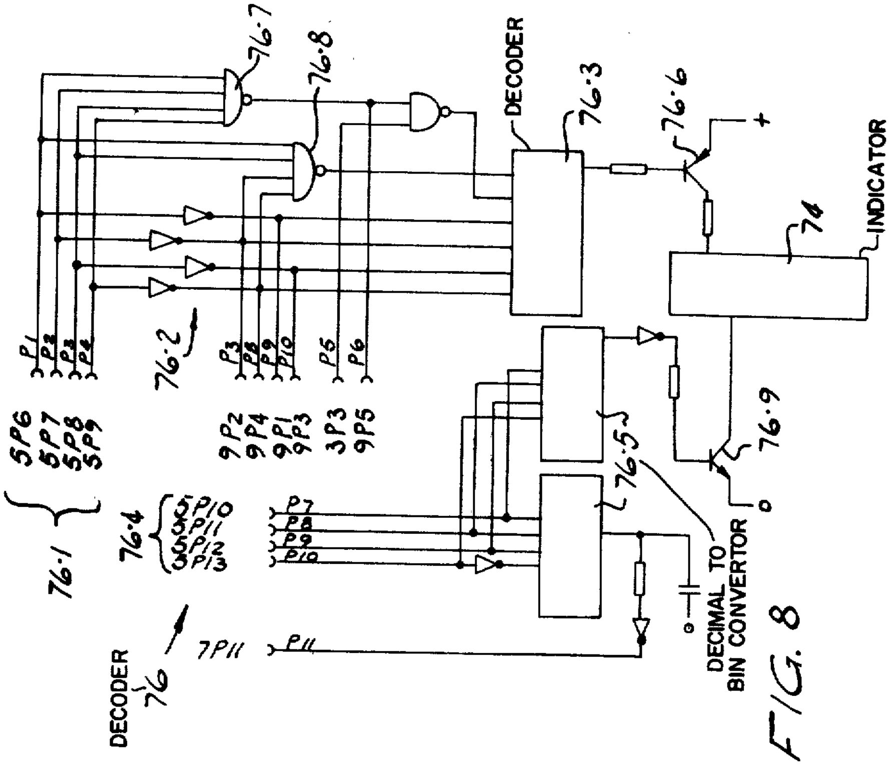
FIG. 8 shows a schematic circuit diagram of the seven segment indicator and associated circuitry used in the FIG. 2 device.

An indication of the number stored in the storage device 62 is given on a seven segment indicator 74, details of which are shown in FIG. 8. The number stored is displayed on the indicator 74 via a decoder 76 for decoding the binary code emitted from the storage device 62 into a form suitable for presentation to the seven segment indicator 74. Further details of the decoder 76 are also shown in FIG. 8.

Figure 17:
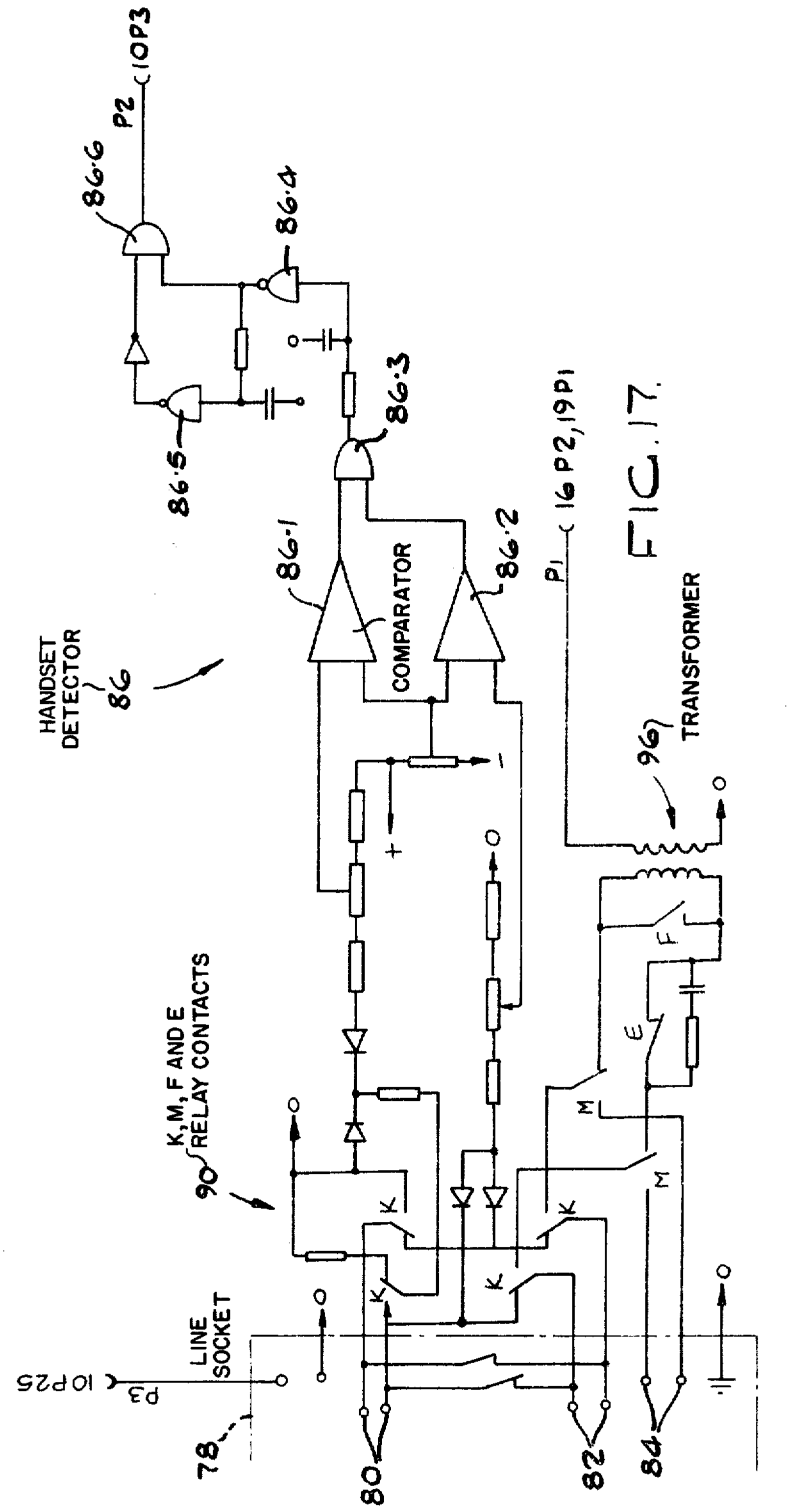
FIG. 17 shows a schematic circuit diagram of an interface circuit and handset detector for the FIG. 2 device.

The device is connected to the telephone lines by means of a line socket 78 details of which are shown in FIG. 17. A telephone is connectable to a line 80 of the line socket 78, and the line socket 78 is connected to the telephone line via a line 82. When the device is used for transmitting data from a modem to a computer, the modem is connected to a line 84.

A handset detector 86 is provided connected to the line socket 78 for detecting when the handset of the telephone is lifted. Details of the handset detector 86 are shown in FIG. 17.

Figure 10:
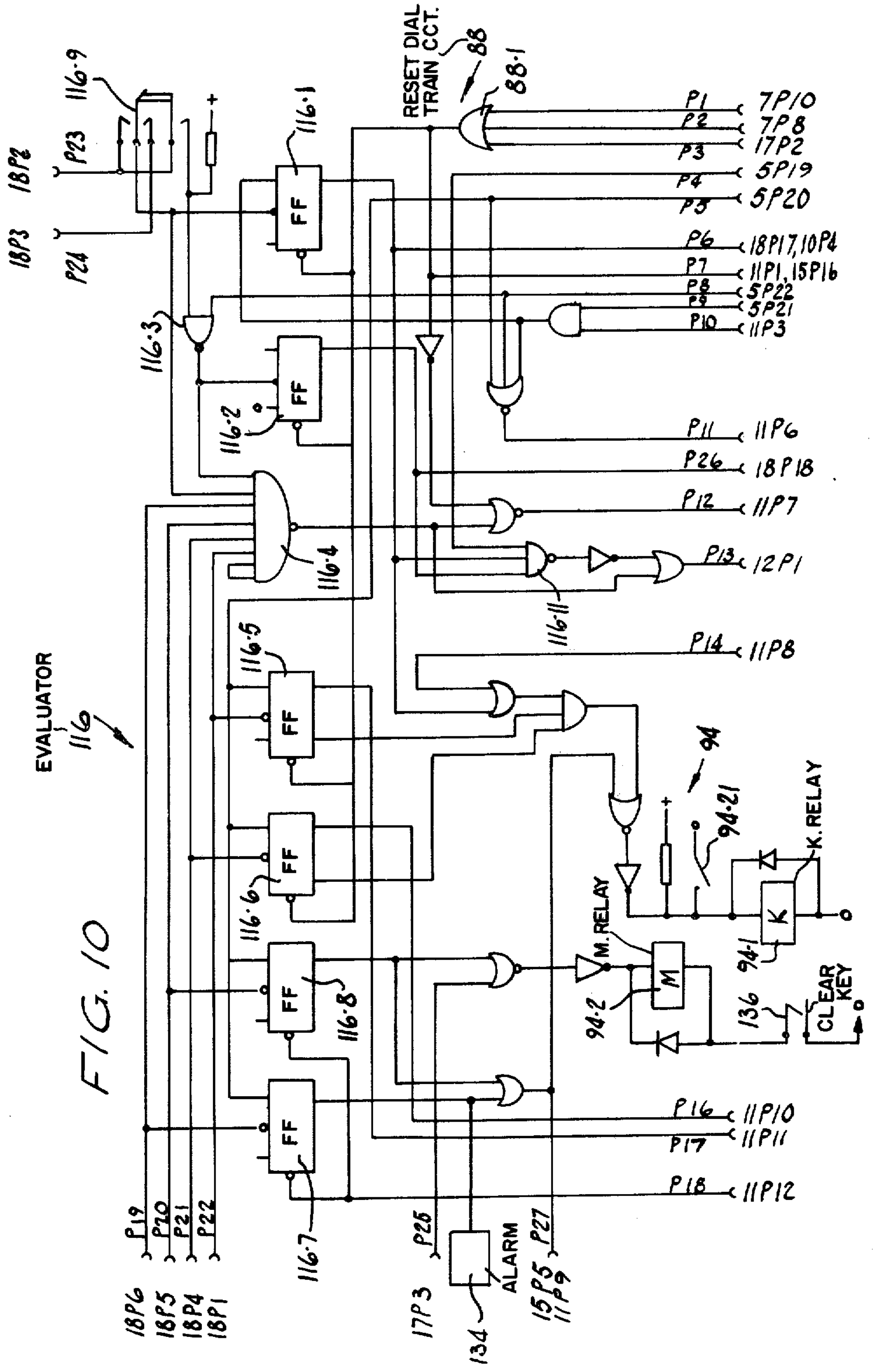
FIG. 10 shows a schematic circuit diagram of an evaluator and associated circuitry for evaluating signals on the telephone line in the FIG. 2 device.

Connected to the handset detector 86, a reset dial train programme circuit 88 is provided for automatically interrupting the operation of the device should the handset detector detect lifting of the handset of the telephone. Details of the reset dial train programme are shown in FIG. 10.

Figure 12:
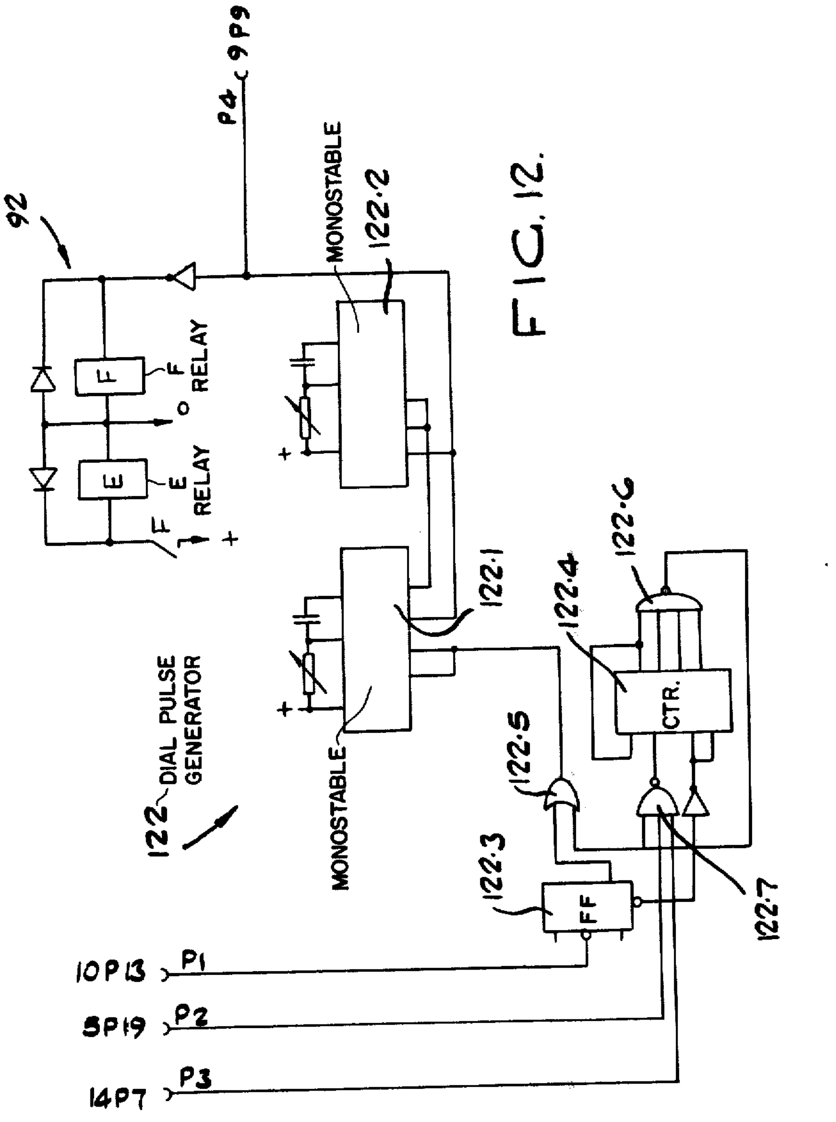
FIG. 12 shows a schematic diagram of a dial pulse generator used in the FIG. 2 device.

A plurality of relays are used for connecting the device to the telephone line and for interconnecting the telephone to the telephone line. The relay contacts are shown in block 90 and are also shown in FIG. 17. The actual relays form part of the control means 66 and are schematically illustrated in blocks 92 and 94. The relays in block 92 are termed E and F relays and are shown in FIG. 12. The relays in block 94 are termed K and M relays and are shown in FIG. 10.

Figure 16:
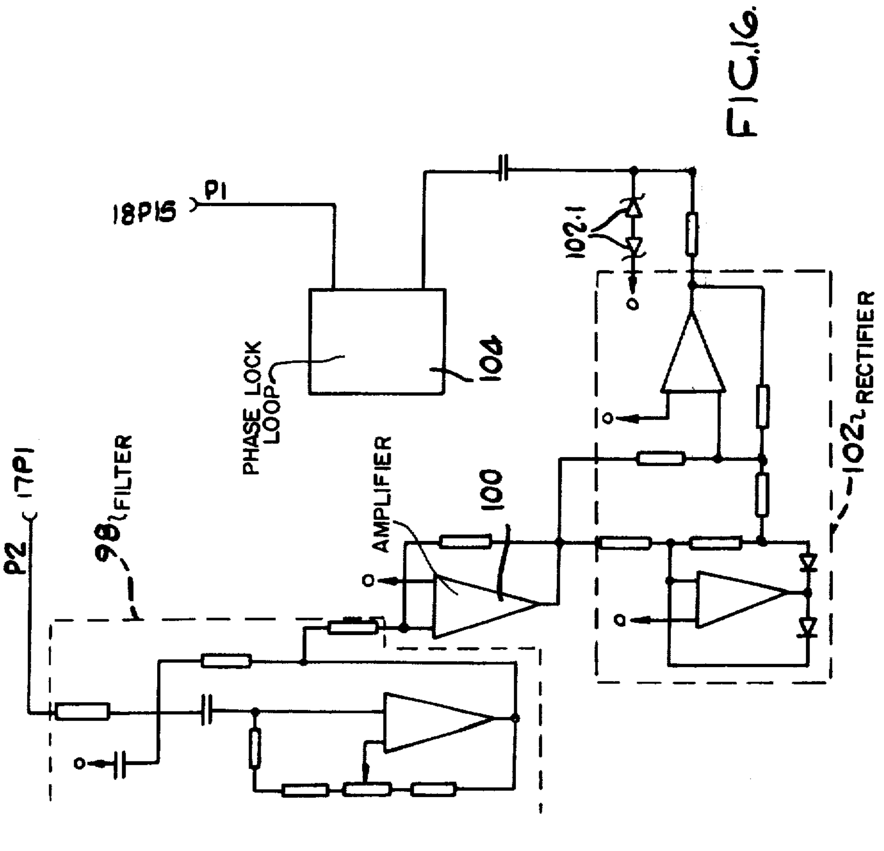
FIG. 16 shows a schematic circuit diagram of a tone detector forming part of the sensing means used in the FIG. 2 device.

A line transformer 96 forms part of the sensing means 64 and is shown in detail in FIG. 17. The line transformer is used to block the relatively high voltage appearing on the telephone line 82 from the circuitry of the device. From the line transformer 96, the signal from the telephone line is fed to a filter circuit 98, and then from an amplifier circuit 100 and a rectifier circuit 102, to a phase lock loop 104, all of which are shown in FIG. 16.

Figure 19:
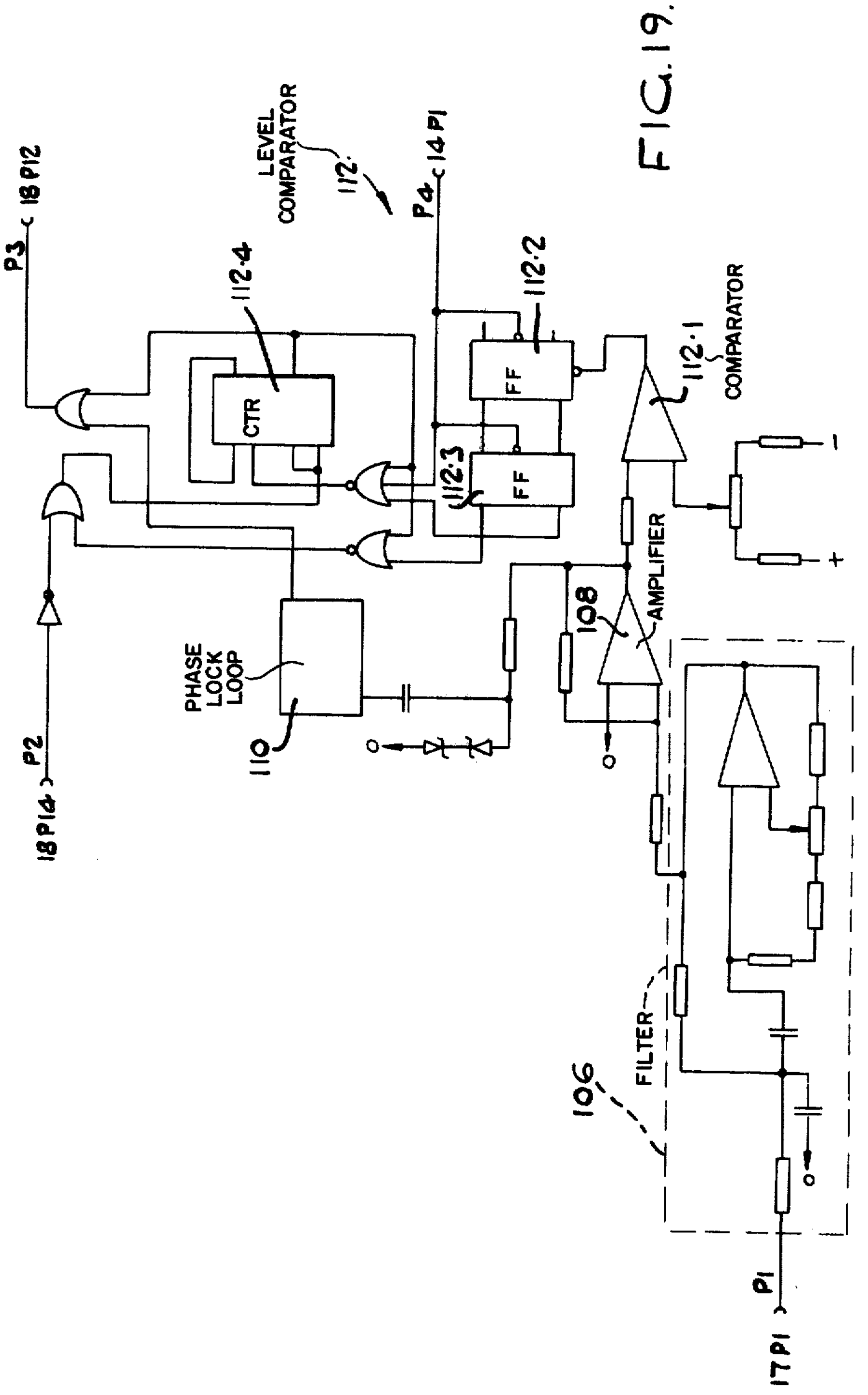
FIG. 19 shows a schematic circuit diagram of a data carrier or level comparator used in the FIG. 2 device for computer terminal working.

When the device is used for transmitting data from a modem to a computer via a telephone line, the signal from the telephone line 82 is transmitted from the line transformer 96 to a further filter circuit 106, to an amplifier 108 and a further phase lock loop 110, all of which are shown in FIG. 19. Also when transmitting data to a computer, a level comparator 112 is used for detecting whether or not the quality of the signal is above a predetermined level, e.g. whether or not the amplitude of the carrier signal on the telephone line is sufficient and uninterrupted for safe transmission of data without errors. The level comparator 112 is also shown in FIG. 19.

Figure 18:
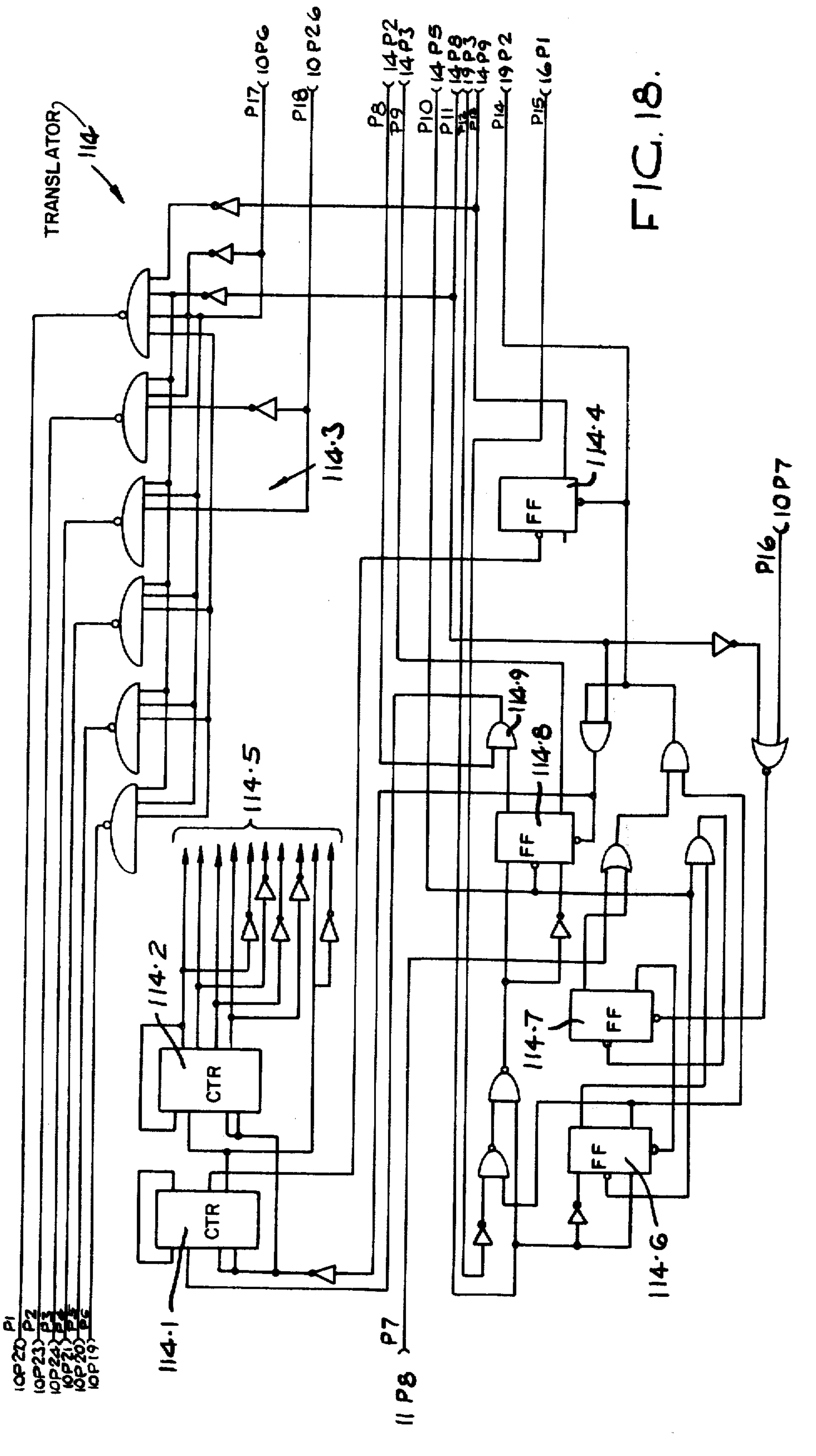
FIG. 18 shows a schematic circuit diagram of a translator circuit forming part of the sensing means used in the FIG. 2 device.

In order to translate the tones appearing on the telephone line, e.g. dialling tone, ringing tone, engaged tone, etc., the translator circuit 114 is provided, details of which are shown in FIG. 18.

The translator 114 feeds the translated signal to an evaluator 116 in the control means 66 where the various tones are evaluated. The evaluator 116 is also shown in FIG. 10.

Figure 9:
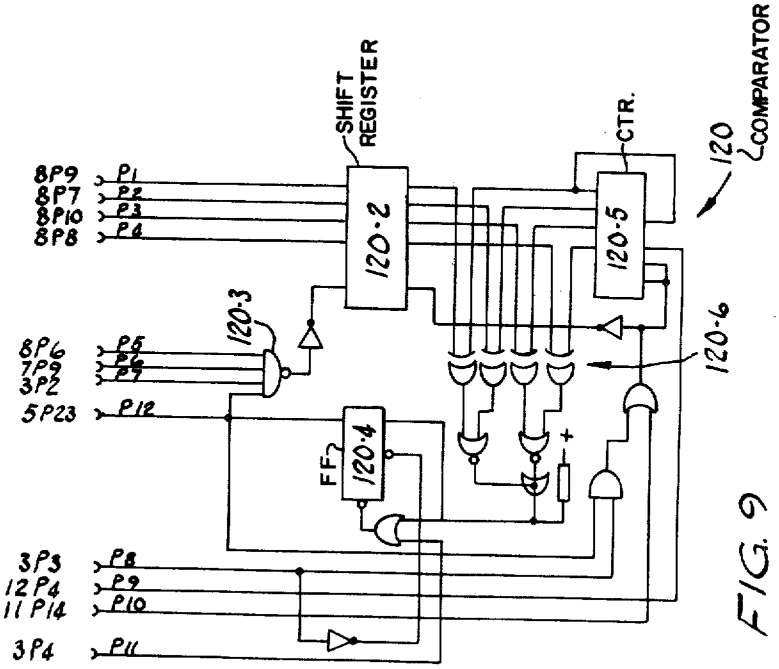
FIG. 9 shows a schematic circuit diagram of a dial pulse comparator for comparing dial pulses in the FIG. 2 device.
Figure 13:
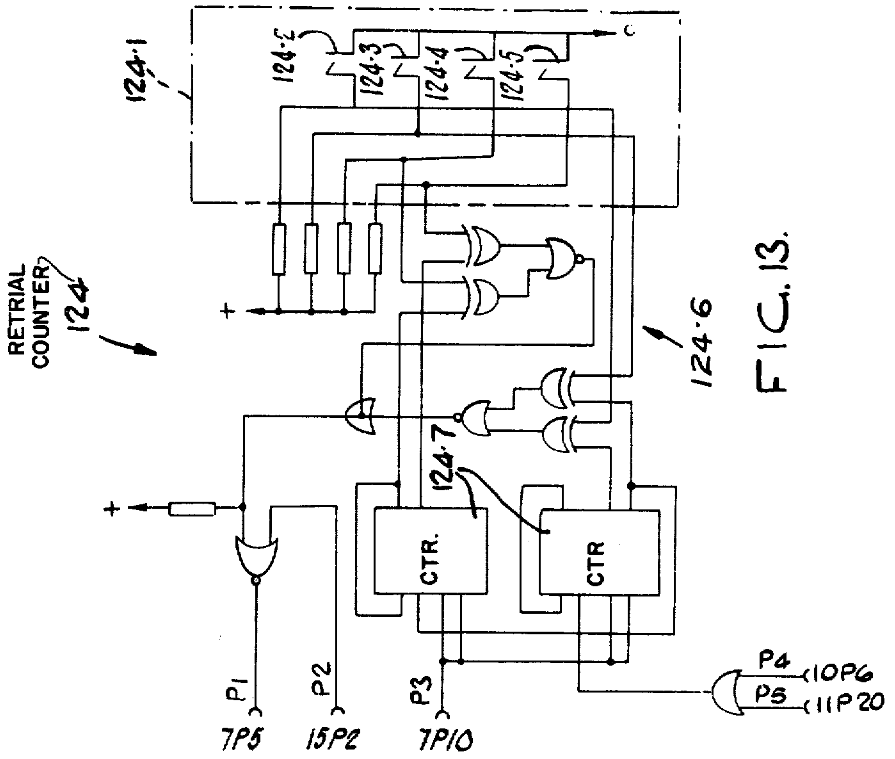
FIG. 13 shows a schematic circuit diagram of a tally storage counter for controlling the number of times that a number is to be recalled in the FIG. 2 device.
Figure 14:
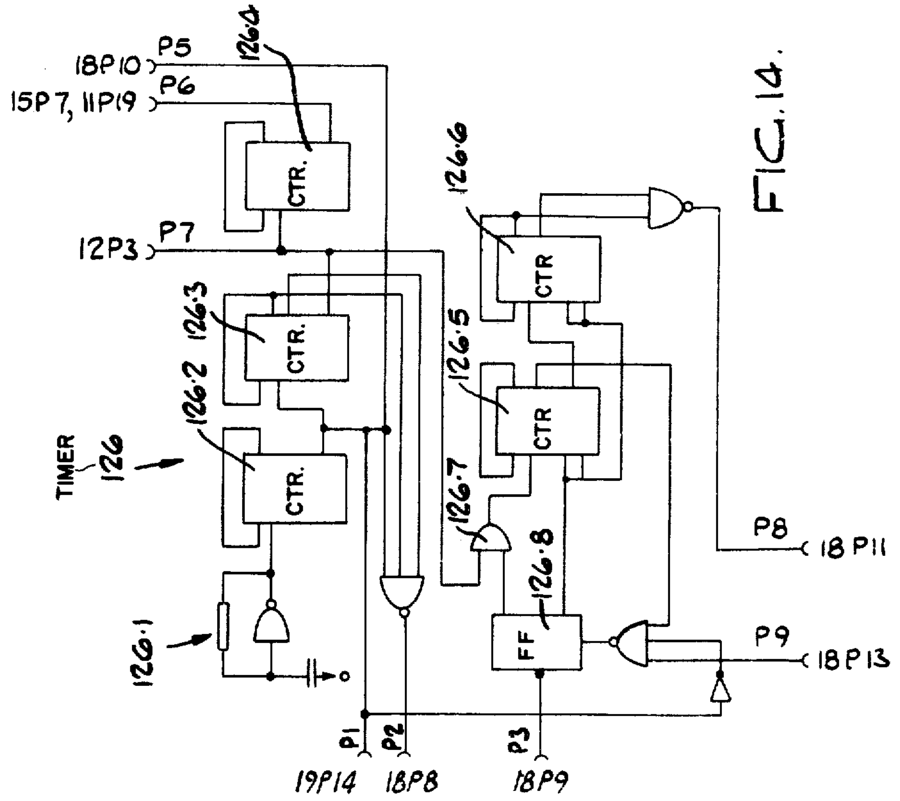
FIG. 14 shows a schematic circuit diagram of a timer used in the FIG. 2 device.
Figure 15:
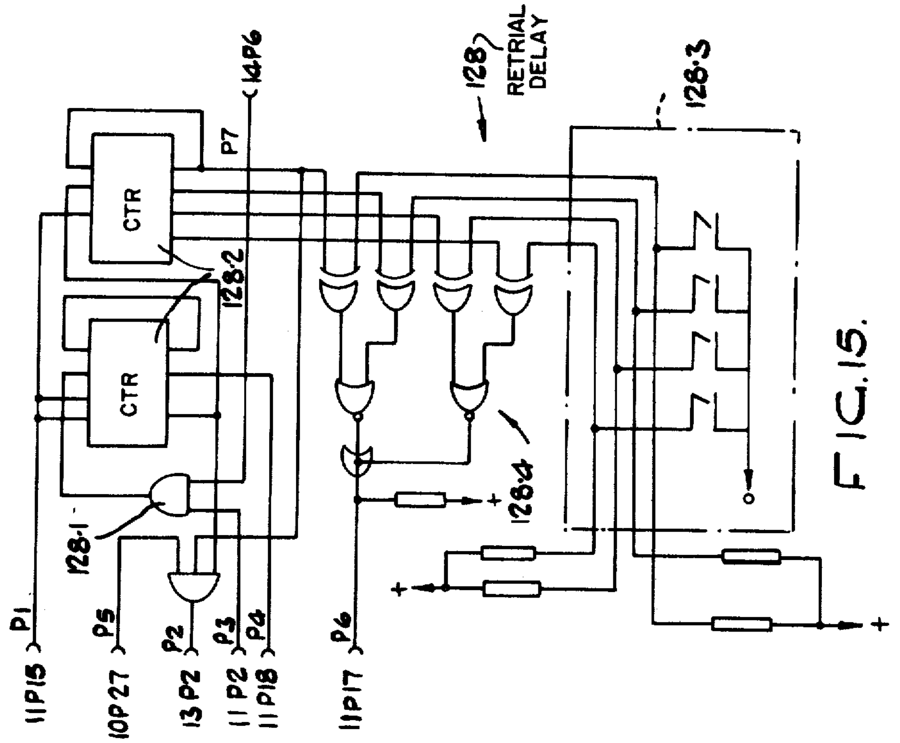
FIG. 15 shows a schematic circuit diagram of a retrial delay circuit used in the FIG. 2 device.

Included in the control means 66 are a memory addressing circuit 118, details of which are shown in FIG. 5; a dial pulse comparator 120, details of which are shown in FIG. 9; and a dial pulse generator 122, details of which are shown in FIG. 12. Also included in the control means 66 are tally storage means in the form of a retrial counter 124, details of which are shown in FIG. 13; a timer 126, details of which are shown in FIG. 14; and a retrial delay 128, details of which are shown in FIG. 15.

Figure 3:
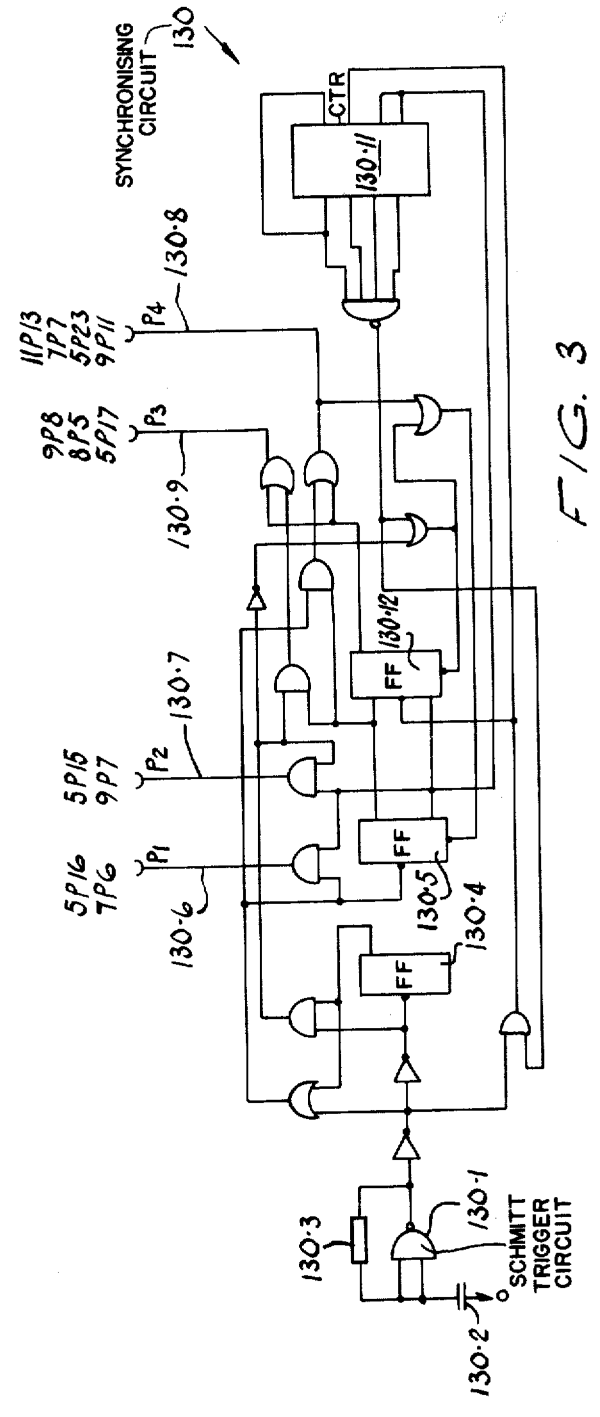
FIG. 3 shows a schematic circuit diagram of a phase shift clock used in the FIG. 2 device.

The control means 66 also includes a phase shift clock or synchronising circuit 130 details of which are shown in FIG. 3. This circuit is used to synchronise the random entering of the number to be stored with specific cycles of the device.

Figure 11:
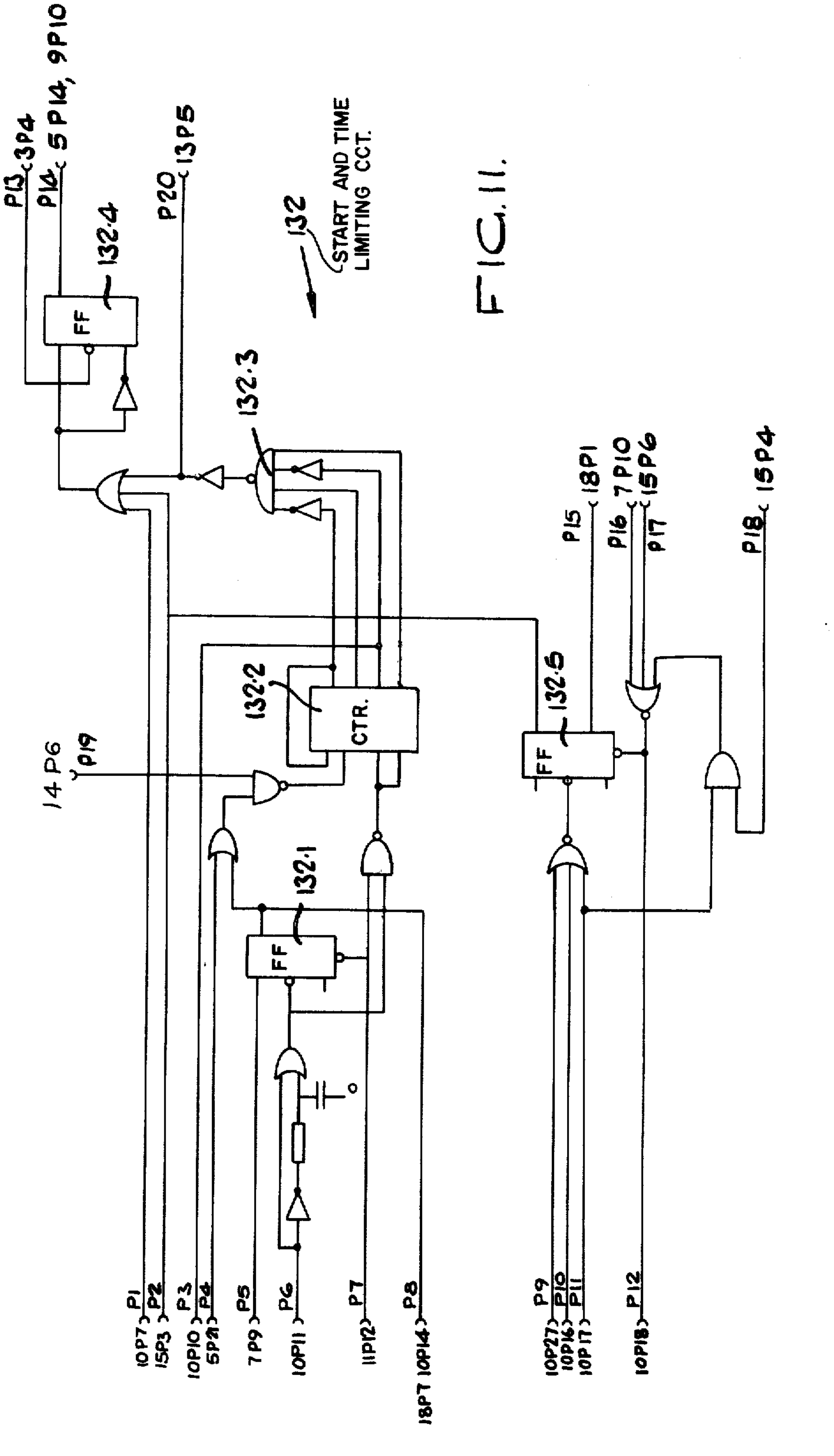
FIG. 11 shows a schematic circuit diagram of the start and time limiting circuits of the FIG. 2 device.

The control means 66 also includes a start and time limiting circuit 132 details of which are shown in FIG. 11. This circuit is used to institute various delay functions during operation of the device.

Also included in the control means 16 is an alarm circuit 134 which is shown in FIG. 10. The alarm circuit 134 is adapted to give an indication to the operator that ringing tone has been detected on the telephone line. Also, a clear key 136 forms part of the control means 66 and this is also shown in FIG. 10. The clear key 136 is used to clear the device when the device is used for computer terminal working.

In use, the operation of the device shown in FIG. 2 is similar to that shown in FIG. 1. The operation is briefly as follows.

Initially, when the device is switched on, the clearing or cancelling circuit 72 automatically resets all the counters in the device.

Operation of the keying unit 67 causes the individual numbers to be stored in serial form in the memory 62, the decimal input being converted to binary code by the encoder 68. At the same time, a counter in the memory addressing circuit 118 is stepped so that each digit of the number is stored in successive positions of the memory 62. A further counter in the memory addressing circuit 118 which is stepped continuously, successively addresses each position of the memory 62 so that whatever number has been stored in the memory 62, is converted to a form suitable for presentation to the indicator 74 by the convertor 76 to display the number stored.

At any time thereafter, when the start key circuit 70 is operated, a read out counter in the memory addressing circuit 118 is reset to zero as is also the dial pulse comparator 120 and the start and time limiting circuit 132.

As the read out counter is now addressing the first position in the memory 62, the digit stored in this memory position is transferred to a register in the dial pulse comparator 120.

The sensing means 64 then translates the signals appearing on the telephone line 82 and this signal is evaluated by the evaluator circuit 116. If a dial tone is detected, the dial pulse generator 122 starts pulsing the E relay of the relays 92 thereby causing dial pulses to be emitted onto the telephone line 82. At the same time, pulses are fed to the dial pulse comparator 120 from the dial pulse generator 122. The dial pulse comparator 120 counts the number of pulses that are emitted. As soon as the number of pulses emitted is equal to the digit which was transferred from the first position of the memory 62, further pulsing of the E relay in block 92 is stopped. The read out counter in the memory addressing circuit 118 is then stepped to address the second position in the memory unit 62 and the digit stored in this position is transferred to the register in the dial pulse comparator 120.

The start and time limiting circuit 132 then institutes a one second delay function. After the one second delay, the dial pulse generator 122 again starts pulsing the E relay in block 92 to cause further pulses to be emitted onto the telephone line. The cycle is then repeated until all the digits of the number stored in the memory 62 have been converted to pulses and the various pulse trains have been emitted onto the telephone line.

If the device is used on a PABX system, where the first digit emitted is used to connect a telephone in the PABX system to the telephone exchange line, the device also makes provision for the exchange dial tone to be detected and be evaluated after the first digit has been emitted but before the second digit is emitted. This merely ensures that an exchange line is available at that time for that telephone. If the exchange dial tone is not detected after the emission of the first digit, the device is reset and a further attempt is made to obtain an exchange dial tone by the re-emission of the first digit onto the telephone line.

After the whole number has been emitted onto the telephone line, the sensing means 64 is again put into operation to detect whether or not calling of the number is effected. If any signal other than ringing tone is detected, the telephone line is freed and re-connected to the telephone so that incoming calls can be received. The retrial counter 124 is stepped by one position and the retrial delay 128 initiates a delay function for a period dependent upon the delay which has been preset by an operator.

After expiration of the delay, the whole cycle of events is repeated so that re-calling of the number is instituted.

If ringing tone is detected, the start and time limiting circuit 132 institutes a controlled delay function for 30 seconds and the alarm circuit 134 is actuated to give an audible indication to the operator that calling has been effected. If within this 30 second delay, the handset detector 86 does not detect that the handset of the telephone is raised, the clear or cancelling circuit 72 resets the device to cancel the call.

If, after a number of repeated attempts to effect calling, calling has not been effected and the retrial counter 124 has been stepped so that equality is detected between the retrial counter and the number preset therein, the clear or cancelling circuit 72 automatically resets the device to stop further operation and it returns to an idling condition.

If at any stage before ringing tone is obtained on the telephone line, the operator desires to use the telephone to effect manual dialling of a particular number, the operator merely lifts the handset. The handset detector 86 then causes the circuit 88 to initiate a reset dial train programme whereupon all the counters are reset except the retrial counter 124. The retrial counter 124 is not reset so that if a number of attempts have already been made to call a particular number, further attempts equal to the number of times preset minus the number of previous attempts only, will be made.

As soon as the handset is replaced, the handset detector 86 causes automatic re-initiation of the attempts to call the number stored after a delay of approximately three seconds instituted by the start and time limiting circuit 132.

The start and time limiting circuit 132 also has an overall 10 second delay control so that if after any attempt to call a number, there is no translatable signal within 10 seconds on the telephone line, a fresh attempt is made to call the number.

The signals appearing on the telephone line are detected and evaluated as follows. Signals appearing on the telephone line 82, are passed via the line transformer 96 to the filter 98 where unwanted noise is filtered out. The filtered signal is then amplified by the amplifier 100, rectified by the rectifier 102 and supplied to the phase lock loop 104.

The phase lock loop 104 allows translation of signals from the telephone lines only of a particular frequency, e.g. 400 Hz. If a signal of 400 Hz is detected, the timer circuit 126 is operated so that a counter is pulsed over a predetermined period for as long as the phase lock loop 104 detects the 400 Hz signal within the period.

Thus, within a predetermined time, say 3 seconds, the counter in the timer 126 is pulsed for a period during which these signals are on. Thus, in any three second period, the evaluator 116 merely looks at this count. It will be apparent that with different signals, different counts will be obtained. In this manner, the signals appearing on the telephone line are converted to digital form so that the various signals can be distinguished and evaluated.

The phase lock loop 104 has an inherent safety feature in that if, due to a noise signal on the telephone line, it is operated only for a short period, and the signal disappears after the short period, a roll back function is initiated so that a fresh three second sampling of the signals on the telephone line is affected.

When used for transmission of data, from a modem, a different frequency, e.g. 950 Hz, is usually used and it is for this reason that the further phase lock loop 110 is provided. However, the operation of the phase lock loop 110 is exactly the same as the operation of the phase lock loop 104 except that the frequency of the modem is sampled rather than the frequency of the signal from the telephone exchange.

The device described and illustrated makes provision for the storing of only one number in the memory 62. If it is desired to store a plurality of numbers which can be selectively emitted onto the telephone lines, the capacity of the memory 62 is merely increased and particular areas of the memory are blocked off and allocated for receiving different numbers. A plurality of start key circuits 70 would then be provided as well as a plurality of memory addressing circuits 118. The individual memory addressing circuits 118 would then be allocated to address particular storage areas in the memory 62. A sequence counter would then be provided so that each area of memory or selected areas of memory would be addressed in turn. There would also be a retrial counter 124 for each area of memory so that numbers stored in different areas of the memory can be respectively re-called different numbers of times. Also, the numbers can be stored at different stages so that a particular number will be dialled a number of times as determined by the tally in its retrial counter irrespective of the number of times that another number has been or will be called.

A brief description of the individual blocks of FIG. 2 will now be given with reference to FIGS. 3 to 19.

In order to show all the components of the device, specific circuits have been schematically illustrated in the various Figures. The inter-connection between the various Figures is indicated as follows. All input and output lines of a particular circuit which are connected to circuits in other Figures have been marked with a P (representing pin) followed by a number. Adjacent the end of the input or output lines, an indication is given to which pin on which circuit diagram that line is connected. Thus, for example, if a particular input or output line is marked 5P14, then this indicates that this input or output line is connected to pin 14 on FIG. 5. An "0" adjacent a line indicates that that line is connected to earth.

Figure 4:
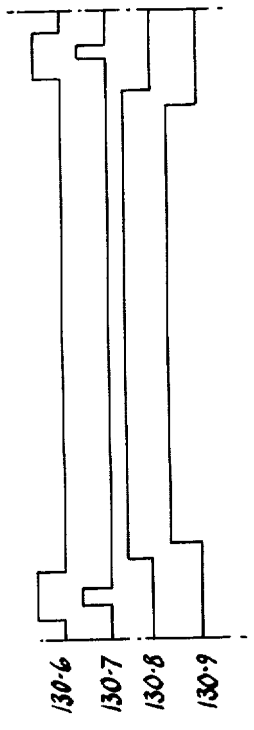
FIG. 4 shows a schematic waveform diagram of pulses appearing at outputs in the Phase Shift Clock shown in FIG. 3.

The phase shift clock 130 shown in FIG. 3 includes a Schmitt trigger circuit 130.1 which, together with a capacitor 130.2 and a feedback resistor 130.3, generates a frequency of about 200 KHz. This frequency is generated as a square wave and is divided by two by a flip flop 130.4. A further flip flop 130.5 together with the flip flop 130.4 cause timing outputs to appear on lines 130.6 and 130.7. The wave shapes and time relationships of the pulses appearing on these lines are shown in FIG. 4. The description that follows is of necessity limited to those parts of the circuitry which it is believed require description in order to understand the principles of the invention. There are components shown in the drawings which are not described but it is believed that their operation and functioning will be readily apparent to those skilled in the art.

The wave shapes shown in FIG. 4 are emitted continuously while the device is on, each pulse appearing twelve times in each cycle of the device. Each pulse appears twelve times in each cycle so that up to twelve digits in a number to be called can be catered for by the device.

The outputs 130.6 to 130.9 are used as scanning or timing pulses for phasing in the asynchronous inputs from the keying unit 67 into the memory 62 at specific times so as to ensure that the memory 62 is properly addressed before information is written into the memory. These pulses are also used to control the seven segment indicator 74 for giving an indication of the number stored in the memory 62.

Referring now to FIG. 5, there is shown the memory 62 which is a 64 bit non-destructive read out store.

The memory 62 is addressed by two address counters 118.1 and 118.2. The counter 118.1 is used to address the memory 62 during reading in and reading out of the number stored in the memory 62. The counter 118.2 is pulsed continually while the device is on so that it addresses all the memory positions in succession. If any number is present in any position addressed, at the appropriate time as determined by the pulses appearing on lines 130.8 and 130.9, the number stored is displayed on the seven segment indicator 74 (FIG. 8) via output lines 118.3.

In order to avoid clashes between the addressing of the memory 62 by the respective address counters 118.1 and 118.2, these two counters are gated to address the memory at different times in each cycle by the timing pulses 130.6 to 130.9. The addressing of the memory 62 by the counters 118.1 and 118.2 is effected via four Wired OR Gates 118.6.

When storing a number in the memory, the binary code of the decimal number will appear on input lines P1 to P4. At the appropriate time as determined by the pulses on lines 130.6 and 130.7 (FIG. 3), the memory 62 is enabled by a flip flop 118.4 so that the continuous binary encoded levels appearing on P1 to P4 while a particular key is depressed are inserted in the memory as pulses. When a particular key is released, the counter 118.1 is stepped by one to address the next position of the memory 62.

When the address counter 118.1 is used to read out the information stored in the memory 62 after the start key has been depressed, it is stepped to address the successive positions of the memory by the dial pulse comparator 120 after emission of each digit of the number stored.

The gate circuits 118.5 are used to detect and emit signals when the address counter 118.1 is addressing the first, second and last positions of the memory 62. When the address counter 118.1 addresses the first position of the memory 62, a signal is generated by the gates 118.5 so that the evaluator 116 can initiate the detection of dialling tone on the telephone line.

When the address counter 118.1 addresses the second position of memory, a signal is generated so that if the device is used with a PABX system, the evaluator 116 can detect whether or not exchange dialling tone is present on the telephone line.

When the address counter 118.1 addresses the last position of the memory 62, a signal is generated so that the evaluator 116 can detect via the sensing means 64 whether or not calling of the number is effected.

Referring now to FIG. 6, details of the keying unit 67 and decimal to binary converter 68 are shown. The keying unit 67 has ten keys which operate a corresponding number of contacts, only three of which are shown. When a decimal one is to be entered in the memory 62, push button operated "normally open" contact 67.1 is operated, and so on up to when a decimal nine is to be entered in the store, push button operated "normally open" contact 67.9 is operated. A decimal nought is entered by operating push button operated "normally open" contact 67.10. The off points of the contacts are connected to a plurality of NAND gates 68.1 to 68.8 by wiring, only some of which is shown. The numerals 1 to 12 give an indication of the wiring between the NAND gates and the contacts 67.1 to 67.10, all the points marked 1 being interconnected, all the points marked 2 being interconnected, and so on.

The NAND gates 68.1 to 68.8 are connected in pairs so as to form flip flops, the NAND gates 68.1 and 68.2 forming a pair, and so on. The outputs of the NAND gates 68.1 to 68.8 are connected to a further NAND gate 68.9. The gate 68.9 is enabled when a key is depressed to enable whatever information is on the NAND gates 68.1 to 68.8 to be written into the memory via the outputs P1 to P4.

After twelve depressions of any of the keys, the input P6 will become high thereby inhibiting all the NAND gates 68.1, 68.3, 68.5, and 68.7 so that no further information can be written into the store. The same condition on the input marked P6 prevails after the start key (FIG. 7) is operated to prevent entering of information in the memory 62 while a number is being called. Because of the arrangement of the NAND gates 68.1 to 68.9 any contact bounce on the contact 67.1 to 67.10 will be ineffective.

Referring now to FIG. 7, details of the start and clear key and associated circuitry are shown. Manual operation of the clear key will operate push button operated "normally open" contact 72.1 which operates NAND gates 72.2 and 72.3. The NAND gates 72.2 and 72.3 are wired as a flip flop and render contact bounce on the contact 72.1 ineffective. When the clear key contact 72.1 is operated, a flip flop 72.4 is set which, via its output 72.5 and 72.6 causes resetting of all the units of the device.

The flip flop 72.4 will remain set for a period until flip flops 72.7 are set. The flip flops 72.7 are set by a converter 76.5 (FIG. 8) after the converter has decoded, in two successive cycles, the address of the last position of the memory 62 as supplied to it by the counter 118.2 (FIG. 5). This ensures that the memory address counter 118.2 is pulsed through at least one full cycle, as, during each stepping of the counter 118.2, one position of the memory is cleared while flip flop 72.4 is set. When the flip flops 72.7 are set, the flip flop 72.4 is reset, which in turn resets the flip flops 72.7.

After ringing tone is obtained and the handset is not lifted within the 30 second period, or after repeated attempts have been made to call a number without success, automatic clearing of the unit is accomplished in the same way by setting the flip flop 72.4 via an AND gate 72.8.

The flip flop 72.4 will also be set when the device is switched on initially by means of the Schmitt trigger 72.9 to effect clearing of the device.

Operation of the start key operates push button operated "normally open" contacts 70.1 which in turn sets a flip flop 70.2 via NAND gates 70.3 and 70.4 (again used to avoid errors caused by contact bounce). A flip flop 70.5 is set thereafter by the timing pulse on output 130.8 of FIG. 3. The setting of the flip flop 70.5 resets the flip flop 70.2. While the flip flop 70.2 is set, various outputs are provided which ensure that circuits used during the dialling of a number are cleared or reset before such dialling commences.

Referring now to FIG. 8, details of the seven segment indicator 74 and binary to seven segment converter 76 are shown.

The outputs on P6 to P9 of FIG. 5 are connected to the inputs 76.1. Since the output from the memory is the complement of its input, the output from the memory is inverted by inverters 76.2 and then presented to the binary to seven segment decoder 76.3. The seven segment indicator 74 has 12 positions corresponding to the 12 positions in the memory 62 which contain the number to be called.

The address at any instant in the address counter 118.2 (FIG. 5) is presented on input lines 76.4 to the decimal to binary converter 76.5. As the address counter 118.2 (FIG. 5) is stepped continuously, the converter 76.5 will therefore also consecutively scan and address the individual segments of the seven segment indicator 74. The scanning is at such a rate that the lights in the seven segment indicator 74 will appear, to the human eye, as illuminated continuously whenever information is present in the store.

The information in the memory is presented to the respective lights in the seven segment indicator 74 from the decoder 76.3 via seven transistors, only one of which, 76.6, is shown. The converter 76.5 addresses the seven segment indicator by means of twelve transistors, only one of which, 76.9, is shown.

While no numbers have been stored in the memory 62, the decoder 76.3 is disabled by means of NAND gate 76.7 so that no indication appears. NAND gate 76.8 is used to cause the decoder 76.3 to illuminate the lights in the seven segment indicator 74 in the configuration of a nought, when a decimal ten is presented from the memory 62.

In FIG. 9, the dial pulse comparator 120 is shown. When the start key 70 is depressed, the digit stored in the position of the memory 62 addressed by the address counter 118.1 (FIG. 5), appears on P1 to P4 and is fed into a shift register 120.2 provided the NAND gate 120.3 is enabled. The NAND gate 120.3 is enabled provided the timing pulse on line 130.7 (FIG. 3) is present, the start key has been depressed, there is information in the store indicated by an output from P6 on FIG. 8, and a flip flop 120.4 is set.

As dial pulses are being emitted onto the telephone line, corresponding pulses are fed into a counter 120.5. The outputs of the shift register 120.2 and the counter 120.5 are compared by four Exclusive OR gates 120.6. Exclusive OR gates are OR gates which give an output when either of the inputs are present but not when all inputs are present. When equality is sensed, the flip flop 120.4 will be set. When the digit stored in the next succeeding position of the memory is entered into the shift register 120.2, the flip flop 120.4 is reset. While the flip flop 120.4 is reset, thereby indicating that there is no equality between the shift register 120.2 and the counter 120.5, an output from the flip flop 120.4 is used to control the pulsating operation of the E relay in block 92 (FIG. 2) to apply dial pulses to the telephone line. When the required number of pulses have been transmitted, equality is sensed by the Exclusive OR gates 120.6 and the flip flop 120.4 is set. The setting of flip flop 120.4 causes the counter 120.5 to be reset and the digit in the next position of the memory 62 to be entered into the shift register 120.2 so that a fresh cycle can start.

If the number of digits in a particular telephone number is less than the number of positions in the memory 62, when the last digit of the telephone number has been emitted, the counter 120.5 is merely stepped up as equality is sensed immediately at the beginning of each cycle.

Refer now to FIG. 10, in which the evaluator 116, the K and M relays 94, the clear key 136 for computer terminal working, the alarm 134 and the reset dial train programme 88 are shown. The clear key 136 is a push button operated "normally open" switch.

The various possible tones i.e. exchange dial tone, PABX dial tone, ringing tone, engaged tone, number unavailable tone, and data carrier tone, are presented to the evaluator 116 as coded digital pulses from the translator 114 (FIG. 18). The digital pulses arrive on P19 to P24.

If the unit is used with a PABX system, a switch 116.9 is switched to allow a pair of flip flops 116.1 and 116.2 to be set in the following manner. The flip flop 116.1 will be set as soon as a coded pulse indicating dial tone appears on P23. If the switch 116.9 is not switched, the flip flop 116.2 will be set at the same time that the flip flop 116.1 is set. If the switch 116.9 is switched, the flip flop 116.2 will only be set upon receipt of the second dial tone, i.e. the exchange dial tone, which appears on P24. The switch 116.9 is a ganged switch comprising an "on, centre and off" set of contacts and a "normally open" set of contacts. The "centre" points of the two sets of contacts are ganged together.

If the flip flop 116.2 is not set within 10 seconds after the flip flop 116.1 setting, thereby indicating that an exchange dial tone is not available, the unit is reset and a further attempt is made to obtain exchange dial tone.

Once the flip flops 116.1 and 116.2 have both been set, an AND gate 116.11 gives an output on P13 to activate the dial pulse generator 122 (FIG. 12) so that emission of dial pulses can be initiated.

The K relay 94.1, which was operated via an input on P14 from the start circuit (FIG. 11) is now held on by the flip flop 116.1. The K relay points (FIG. 17) are used to connect the telephone line to the device.

After all the digits of the number have been emitted, tone pulses are again detected. If flip flops 116.5 or 116.6 are set, i.e. number unavailable tone or engaged tone has been detected, the K relay 94.1 is released and a clear pulse is transmitted from P16 to P17 to instruct the device that calling has not been effected.

If a flip flop 116.7 is set, i.e. ringing tone has been detected, the K relay 94.1 is held operated for a time interval of 30 seconds to afford opportunity to the operator to lift the handset although the rest of the device is cleared immediately via an output on P27. The setting of the flip flop 116.7 also activates the buzzer 134 to indicate to the operator that ringing tone has been obtained.

A flip flop 116.8 will be set only for computer terminal working when a data carrier tone is detected. This causes energisation of the M relay 94.2 as well as the K relay 94.1 via contact 94.21 of relay 94.2.

The reset dial train programme is also shown in FIG. 10. Whenever during automatic dialling, an operator wishes to make a call, the handset is merely lifted which causes an input to appear on P3 of FIG. 10 from FIG. 17. Unless the device has at this stage obtained ringing tone, or is operating in conjunction with a modem, an output from an OR gate 88.1 caused by the input on P3 will reset all the flip flops 116.1, 116.2, 116.5, 116.6 and 116.8. If ringing tone has been obtained by the device, when the operator lifts the handset, ringing will be heard from the handset ear piece and thus it is not necessary that the operation of the device be interrupted, although, if necessary, the operator could do this by replacing the handset. The operator could then effect calling by manual dialling. It is undesirable that an operator can interrupt the operation of the device when it is used in conjunction with a modem. It is for this reason that lifting of the handset cannot affect the operation of the device when used for computer terminal working.

The output from OR gate 88.1 is also used to clear various other components of the device which do not contain permanent information required when the handset is replaced, such as the number stored in the memory and the retrial counter.

Refer now to FIG. 11 in which the start and time limiting circuit 132 is shown. The circuit 132 has a flip flop 132.1 which is set from an input on P5 indicating that a particular digit of the number to be dialled has been removed from memory and inserted in the dial pulse comparator 120 (FIG. 9). The setting of the flip flop 132.1 allows the unit to initiate the detection of dial tone if the first position of memory is being addressed, and also if the second position of memory is being addressed and the device is used within a PABX system.

If the flip flop 132.1 is set and the unit is in a condition where dial tone must be detected, a counter 132.2 is stepped by pulses spaced one second apart from P19.

If the counter 132.2 is stepped to a count of 10, i.e. after 10 seconds, and by that time a dial tone has not been detected, an AND gate 132.3 causes the setting of a flip flop 132.4.

The setting of the flip flop 132.4 causes that attempt to call the number to be cancelled and causes the initiation of a fresh attempt to call the number.

The flip flop 132.4 is also set by the setting of a flip flop 132.5 which is set whenever the number unavailable tone or engaged tone is detected.

The flip flop 132.4 will be prevented from being set if, within the 10 second period, the flip flop 132.1 is reset. The flip flop 132.1 is reset via an output from AND gate 116.4 (FIG. 10), which will occur when dial tone is detected.

The counter 132.2 is also used to give a minimum delay of 4 seconds after an unsuccessful attempt is made to call a number so as to ensure that the telephone exchange equipment settles down before a fresh attempt is made to call a number.

The counter 132.2 is also used after all the digits of a number have been dialled to check that within 10 seconds, ringing tone, engaged tone, or number unavailable tone, is detected, so that the device does not wait indefinitely if for some reason after a number has been properly dialled, no tones appear.

In FIG. 12, the dial pulse generator 122 and the E and F relays 92 are shown. The E and F relays are pulsed by a pair of monostables 122.1 and 122.2 thereby operating their contacts 90 (FIG. 17). The contacts of relay E are used to open and close the telephone line loop to transmit dial pulses onto the telephone line. The contacts of relay F are used to short circuit the line transformer 96 to prevent spikes caused by the opening and closing of the E relay contacts affecting the translator 114.

When the start key has been depressed, and dialling tone has been detected by the evaluator 116 (FIG. 10), an input is obtained on P1 and P2 thereby setting a flip flop 122.3 and opening a gate 122.7. Pulses are provided on P3 spaced 1/16th of a second apart thereby causing a counter 122.4 to be stepped via the gate 122.7. When the counter 122.4 reaches a count of 16, i.e. after 1 second, the monostable 122.1 is triggered via AND gate 122.6 and OR gate 122.5.

The monostables 122.1 and 122.2 are interconnected so that they trigger each other oscillator fashion at a frequency of 10 cycles per second, the monostable 122.2 being set for 66⅔ milliseconds and the monostable 122.1 being set for 33⅓ milliseconds, in each cycle.

The output of the monostable 122.2 is used to energise relay F which in turn operates relay E.

The monostables 122.1 and 122.2 will oscillate as long as the flip flop 122.3 is set. The flip flop 122.3 is reset when the dial pulse comparator 120 (FIG. 9) senses that the required number of pulses have been emitted.

When the next digit is to be emitted, the flip flop 122.3 will again be set from an input on P1 but the monostables 122.1 and 122.2 will only start oscillating after the counter 122.4 has counted up to 16, i.e. after 1 second. In this manner, a 1 second inter-digital pause is provided between the transmission of each digit of the number to be called.

The output on P4 is used to step the counter in the dial pulse comparator 120 (FIG. 9) for comparison of the number stored with the number of dial pulses emitted.

In FIG. 13 the retrial counter 124 is shown. The number of times that a particular number is to be called is preset by a variable switch 124.1. The device makes provision for a number of attempts to be made in multiples of four. When four attempts are to be made, contacts 124.2 are closed. Similarly when eight attempts, 16 attempts, or 32 attempts are to be made contacts 124.3, 124.4 and 124.5, respectively, are closed. It is of course possible to preset e.g. twelve attempts by closing contacts 124.2 and 124.3. The contacts 124.2, 124.3, 124.4 and 124.5 are push button operated contacts of the "normally open" type.

Whenever an unsuccessful attempt is made to call a number, and the evaluator 116 (FIG. 10) receives a request to evaluate if dial tone is present, a pair of series counters 124.7 are stepped. Exclusive OR gates 124.6 compare the output of the counters 124.6 with the setting of the variable switch 124.1 and when equality is sensed, an output is provided on P1 to clear the device to place it in an idling condition.

Referring now to FIG. 14, the timer 126 is shown. A circuit 126.1 comprising a Schmitt trigger, a feed back resistor and capacitor, is adapted to generate a square wave oscillating at a frequency of 4096 Hz. This square wave is fed to a plurality of counters 126.2, 126.3, and 126.4. It is also fed to two series counters 126.5 and 126.6 when an AND gate 126.7 is enabled by a flip flop 126.8.

In this manner, various timing outputs are provided, e.g. on P7 pulses 1/16th of a second apart are obtained. Similarly on P6 pulses 1 second apart are obtained.

The flip flop 126.8 is set from input on P3 from the translator 114 (FIG. 18) to initiate a precise three second interval by means of the counters 126.5 and 126.6 during which a sampling of the signals appearing on the telephone line is made. The use of this 3 second interval is described with reference to FIG. 18.

In FIG. 15, the retrial delay 128 is shown. After an unsuccessful attempt is made to call a number, an AND gate 128.1 is enabled so that a series of counters 128.2 are stepped by pulses 1/16th of a second apart appearing on P7. The delay required is adjustably preset by a variable switch 128.3. The variable switch 128.3 comprises four "normally open" switches each individually operable to provide a predetermined delay. The output of the counters 128.2 is compared with the value preset in the variable switch 128.3 by means of Exclusive OR and NOR gates 128.4. An output is obtained on P6 while the counters 128.2 are being stepped and until the output of the counter 128.2 compares with the value preset in the switch 128.3. During this period, the device merely idles so that the delay between successive attempts is controlled.

Refer now to FIG. 16 in which the tone detector circuit is shown. The tone detector includes an active filter 98 for filtering out unwanted noise on the telephone lines, an operational amplifier 100 for amplifying the filtered line signals, and a precision rectifier circuit 102 which effectively doubles the frequency of the signal from the telephone line. The output of the rectifier 102 is fed to a phase lock loop integrated circuit 104. The rectifier 102 is used to double the frequency of the signal on the telephone line as, in some cases, a phase lock loop is slow to lock onto a low frequency signal.

Monitoring of the signals on the telephone line occurs when relay K of relays 94 (FIG. 10) is operated. The signals are then transmitted to P2 via the line transformer 96 (FIG. 17). After filtering, amplification and rectification of the signals, two zener diodes 102.1 are used to clamp the amplitude of the signals below a peak value of about 5 volts. The phase lock loop 104 is a standard integrated circuit and is used to lock onto a particular frequency, e.g. 400 Hz., i.e. it is operated only if that particular frequency is present on the telephone line.

This circuit is used merely to ensure that the translator 114 only translates signals of a particular frequency, the frequency being determined by the frequency of the signals transmitted on the telephone lines in the area in which the device is used.

Refer now to FIG. 17 in which the circuitry for linking the telephone line to the telephone and to the device, as well as the handset detector 86, is shown.

Operation of relay K (see FIG. 10) during automatic dialling separates the telephone which is connected to sockets 80 from the telephone line connected to sockets 82. The points of relay K also connect the telephone line on sockets 82 to the line transformer 96 and thus to the sensing means 64.

The connection between the telephone and the telephone line is monitored by means of the handset detector 86 including two comparators 86.1 and 86.2.

Whenever the handset is lifted and replaced again, one of the comparators 86.1 and 86.2 is operated. Operation of either comparator 86.1 or 86.2 opens an AND gate 86.3 whereupon a delay function is initiated by two Schmitt trigger circuits 86.4 and 86.5. After the delay, an AND gate 86.6 is opened and a clear signal is transmitted from P2 to permit the initiation of automatic dialling again.

The delay is used so that automatic dialling does not commence immediately to ensure that the exchange equipment is properly cleared.

During automatic dialling, the comparator 86.1 monitors whether or not the handset is lifted to permit interruption of automatic dialling by an operator.

The comparator 86.2 is used to prevent operation of the device should the start key be operated while the handset is lifted.

The comparators 86.1 and 86.2 monitor these conditions by monitoring the voltage on the telephone line 80. The voltage on the telephone line will change as soon as the handset is lifted as a loop, formed by a resistance of about 100 ohms, will be placed on the line when the handset is lifted.

The relay M contacts are used to connect the telephone line via sockets 82 to a modem connected to sockets 84.

The E and F relay contacts are used to transmit the trains of dial pulses, the F contact closing before the E contact opens, and the F contact opening before the E contact closes. This prevents high voltage spikes being transmitted into the device, a spark quenching circuit being used across the E contact.

Refer now to FIG. 18 in which the translator 114 is shown. The translator 114 is closely associated with the tone detector circuit (FIG. 16), and the data carrier signal analyser circuit (FIG. 19) used when the device is operated in conjunction with a modem.

While either of the phase lock loop circuits 104 (FIG. 16) or 110 (FIG. 19) are on, thereby indicating that the particular frequency which is looked to is present on the telephone line, a pair of counters 114.1 and 114.2 are stepped by clock pulses every 2.8 milliseconds.

The signals on the telephone line are sampled for a period of 3 seconds whereupon further pulses to the counters 114.1 and 114.2 are stopped.

Although in different countries or in different areas the signals can differ, an example of the periods during which the phase lock loops 104 or 110 will be on when the various signals are present is given below.

Unavailable tone — during the three seconds sampling period, the signal is present for 2,500 milliseconds and is off for 500 milliseconds.

Engaged tone — during the three second sampling period, the signal will be present for 750 milliseconds, off for 750 milliseconds, present for 750 milliseconds again and again off for 750 milliseconds.

Ringing tone — during the three second sampling period, the signal will be present for 400 milliseconds, off for 200 milliseconds, on for 400 milliseconds again, and then off again for 2,000 milliseconds.

Dialling tone — this signal appears as a continuous tone of a particular frequency but modulated by a 33 Hz signal.

It will be appreciated from the above, because of the differences in the on times of the various signals, in the three second sampling period, the counter 114.1 and 114.2 will be stepped by varying amounts when the respective signals appear on the telephone line. The outputs of the counter 114.2 are connected to six NAND gates 114.3. The connections between the outputs 114.5 of the counter 114.2 and the NAND gares 114.3 have not been shown as these will vary according to the tones to be detected in different areas or countries. Dependent therefore on the particular tone received, one of the NAND gates 114.3 will be operated.

The outputs of the NAND gates 114.3 are fed to the evaluator 116 (FIG. 10) via P1 to P6 where the translated signals are evaluated to determine the further operation of the device.

The translator 114 includes various safety features to ensure that during the three second sampling period, the counter 114.1 is stepped only when a definite tone signal is present and not by a noise signal. If, due to a noise signal, the counter 114.1 is not stepped above a count of four, a flip flop 114.4 is set and a fresh three second sampling period is initiated.

This is accomplished by the flip flops 114.6, 114.7 and 114.8. When a tone is detected, the flip flop 114.6 is set. This will allow the flip flop 114.7 to be set, which in turn allows the flip flop 114.8 to be set. The times at which the setting of the flip flops 114.7 and 114.8 occur is controlled by pulses from the timer circuit (FIG. 14).

Once the flip flop 114.8 is set, an AND gate 114.9 is enabled to permit the counters 114.1 and 114.2 to be stepped.

When the counter 114.1 reaches a count of four, the flip flop 114.4 is set which, as described above, initiates the 3 second sampling period of the tones appearing on the telephone line.

In order to enable the flip flop 114.4 to be set, the counter 114.1 must reach a count of four while the flip flops 114.7 and 114.8 remain set. If the flip flop 114.4 is not set, i.e. because the tone on the telephone line is not a proper tone but is merely a noise signal appearing for a period less than the time taken for the counter 114.1 to count to four, the counters 114.1 and 114.2 are reset and a fresh 3 second sampling period is initiated.

Refer now to FIG. 19 in which the analysis of signals is effected when the device is assoicated with a computer terminal modem. As in FIG. 16, the signal from the telephone line is fed to an active filter 106 to filter unwanted noise. The centre frequency of the active filter 106 is dependent upon the carrier frequency used in the modem. The filtered signal is then amplified by the operational amplifier 108 and fed to the phase lock loop 110. If the signal on the telephone line is that to which the phase lock loop 110 has been preset, an output is provided on P3 which is fed to the translator 114 (FIG. 18).

The output of the operational amplifier 108 is also fed to a comparator 112.1 of the level comparator 112. The comparator 112.1 will be operable only if the frequency level on the telephone line is of a particular level, e.g. of an empirical value of minus 26 decibels.

If the frequency level on the telephone line is below the predetermined level, a flip flop 112.2 is set when a clock pulse on P4 arrives. Upon the arrival of the next clock pulse on P4, a further flip flop 112.3 is set unless the flip flop 112.2 is again reset by the comparator 112.2 sensing a signal frequency above the predetermined level.

If the signal frequency level remains below the predetermined level, with each setting of the flip flop 112.3, or if it remains set, a counter 112.3 is stepped. When the counter 112.4 reaches a count of four, an output is provided on P3 to clear the device.

In effect therefore, the carrier frequency on the telephone line must reach a sufficiently high amplitude at least once in every 1 millisecond period in order to clear the flip flop 112.2 and prevent counting by the counter 112.4. The level of the carrier frequency on the telephone line is thus monitored. In addition, any interruptions for a period longer than one millisecond can be detected. In this manner, a line which will give errors in the transmission of data from a modem to a computer will not be used as operation of the device with such a line will be prevented.

Figure 20:
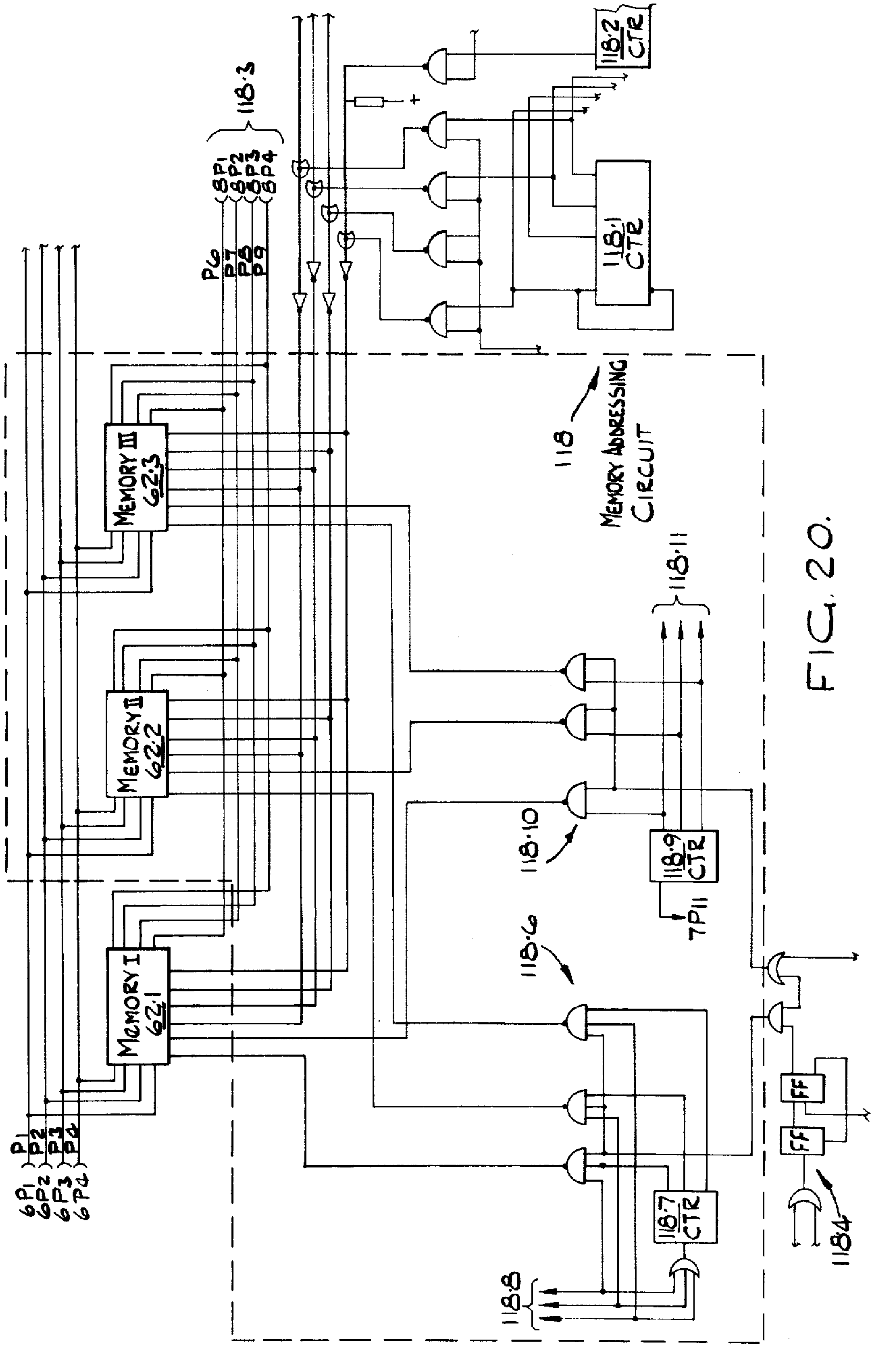
FIG. 20 shows a schematic circuit diagram of the additions required to the circuitry of FIG. 5 when a plurality of sets of numbers are to be stored in the storage device.

Refer now to FIG. 20 in which is shown the additions necessary to FIG. 5 when a plurality of numbers are to be stored and selectively emitted. The additions necessary to FIG. 5 are shown enclosed in dotted lines, the portions outside the dotted lines corresponding to the portions already shown in FIG. 5. These are included merely to show the interconnection between the additions and the existing circuitry of FIG. 5.

Instead of only one memory 62, a plurality of memories 62.1, 62.2, 62.3 etc., are required, the number of memories being dependent upon the number of sets of numbers it is desired to be stored. All the memories 62.1, 62.2, 62.3 are connected in parallel across the inputs from pins P1 to P4 and the outputs of the respective memories are connected in parallel on to the output pins P6 to P9. Each memory is enabled so that information can be stored therein by means of three AND gates 118.6. The AND gates 118.6 are controlled by a sequence counter 118.7 which is triggered to address each of the memories in turn via input leads 118.8. The leads 118.8 are each connected to a separate start key circuit 70 (see FIG. 7) and in fact are connected to the output of the NAND gate 70.3 in FIG. 7. A plurality of start key circuits 70 would be required, one for each memory used. Each start key circuit 70 would however be merely a duplicate of that shown in FIG. 7.

When the counter 118.7 is addressing the first memory 62.1, depression of the keys 67 (FIG. 6) will cause a number to be entered therein as only this memory is enabled. When the associated start key 70.1 has been depressed, the counter 118.7 will be triggered to address the second memory 62.2. Further depression of the keys 67 will cause a further number to be entered in memory 62.2. Thus by entering the numbers via the keys 67 (FIG. 6) and by depressing the start key 70.1 (FIG. 7) a plurality of sets of numbers can be entered into the various memories.

In order to read out from the various memories, a further sequence counter 118.9 is provided which controls a plurality of AND gates 118.10. The counter 118.9 is triggered continuously so that each of the memories are addressed in turn. As soon as information is detected in any one memory, the number contained therein will be emitted as previously described, provided, of course, the other necessary conditions are met, e.g. dialling tone is present.

The AND gates 118.10 also prevent the counter 118.9 addressing any subsequent memory until an input is obtained on input leads 118.11 which are connected to the output pin P1 of the respective retrial counters 124, one of which is shown in FIG. 13. Thus, until the preset number of attempts as represented by the tally have been made for a particular number, only the one memory will be addressed. Once the tally has been exhausted, only then will the AND gates 118.10 allow the counter 118.9 to address a subsequent memory for the number stored therein to be emitted to effect calling of that number.

It is to be appreciated that for each memory used, a separate start key circuit 70 as shown in FIG. 7, and a separate retrial counter 124 as shown in FIG. 13 must be provided. These have not been illustrated in the drawings as they are merely duplicates of the existing circuits.

What I claim is:

1. A method of controlling the calling of a number on a telephone line, which includes using a number storage device to store at least one number to be called providing a tally storage device to permit storing by an operator for each call to be made of a variable tally representative of the number of times that a particular number is to be recalled if calling is unsuccessful, controllably emitting the stored number from the storage device onto the telephone line to cause calling of the number, sensing whether or not the call is completed, and, if not completed, controlling the storing device automatically to re-emit the stored number a predetermined maximum number of times as determined by the tally thereby to cause repeated attempts to call the number, and providing control means to permit control by the operator for each call made of the interval between successive attempts to call the number stored.

2. A method as claimed in claim 1, in which a plurality of sets of numbers to be called are stored in the storage device, and which includes controlling the storage device selectively to emit a particular set of numbers from the storage device and controlling the storage device to emit a further set of numbers when calling of a preceding set of numbers has been successfully completed or when the predetermined number of attempts have been made without calling being completed.

3. A method as claimed in claim 1, which further includes controllably cancelling the calling of the number if, after initiation of the calling of the number, a predetermined period elapses without calling being completed.

4. An automatic dialling device for emitting a number to be called onto a telephone line, which includes a storage device adapted to receive a number to be called and operable to emit the stored number onto the telephone line, sensing means adapted to sense whether or not calling of the number is completed, and control means responsive to the sensing means and operable to cause the storage device to re-emit the stored number onto the telephone line to recall the number if calling has not been completed, the control means including tally storage means operable by an operator for each call to be made to permit storing of a variable tally representative of the number of times that a particular number is to be recalled, the control means being adapted to cause recalling of the number for a maximum number of times as predetermined by the tally, and timing means with said control means being responsive to said timing means to provide an interval between successive attempts to recall the number.

5. A device as claimed in claim 4, in which the timing means includes at least one counter triggerable by a series of pulses at a fixed frequency, the output of the counter being comparable with a predetermined output generated by switch means, the switch means being adjustably pre-settable by an operator to provide variation of the interval between successive attempts to recall the number.

6. A device as claimed in claim 4, which includes indicating means operable to give a visual indication of the number stored.

7. A device as claimed in claim 4, in which the sensing means includes tone detection means operable after a number has been called and adapted to sample during a predetermined period the tones appearing on the telephone line thereby to sense whether or not calling of the number has been completed.

8. A device as claimed in claim 7, in which the tone detection means include analogue to digital conversion means adapted to convert the tones received on the telephone line to digital pulses or levels.

9. A device as claimed in claim 4, adapted for association with a computer terminal modem and adapted to call a number allocated to a computer thereby to permit a telephone connection between the modem and the computer, which includes monitoring means for monitoring the quality of signals on the telephone line, the monitoring means being adapted to prevent connection of the telephone line to the modem if the quality of the signals is below a predetermined level.

10. A device as claimed in claim 9, in which the monitoring means is adapted to monitor both the amplitude and presence of the signals over a predetermined period.

* * * * *